Figure 1:
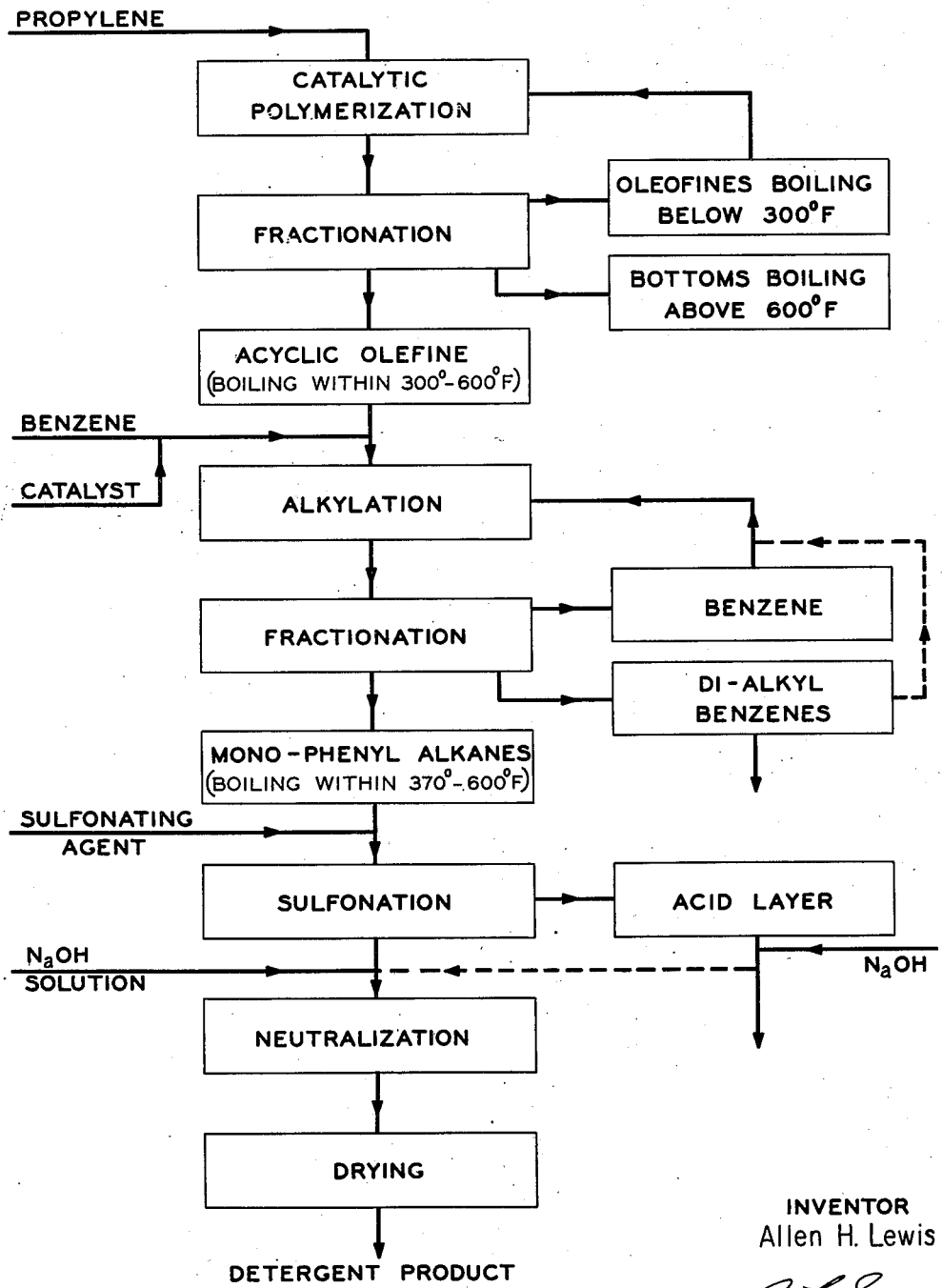

INVENTOR
Allen H. Lewis
BY: [signature]
ATTORNEY

March 17, 1953     A. H. LEWIS     2,631,980
NONCAKING ALKYL ARYL SULFONATE DETERGENT COMPOSITIONS
Filed July 22, 1949     4 Sheets-Sheet 4

INVENTOR
Allen H. Lewis
BY:
ATTORNEY

Patented Mar. 17, 1953

2,631,980

UNITED STATES PATENT OFFICE 2,631,980

NONCAKING ALKYL ARYL SULFONATE DETERGENT COMPOSITIONS

Allen H. Lewis, Berkeley, Calif., assignor to California Research Corporation, San Francisco, Calif., a corporation of Delaware Application July 22, 1949, Serial No. 106,143

6 Claims. (Cl. 252—161)

1

This invention relates to a novel mixture of new phenyl-substituted alkanes and sulfonated derivatives thereof. More particularly the invention is concerned with the production of such compounds in which the alkane portion of the molecule is of relatively high molecular weight and preferably contains from about 12 to about 15 carbon atoms.

In the production of sulfonate detergents and particularly their relatively high molecular weight phenyl alkane components by alkylation or condensation reactions, a paramount problem has been the provision of a suitable alkane. Olefins such as butene polymers have been proposed as an alkane source, but introduce outstanding difficulties which arise from instability of the branched-aliphatic chains characteristic of such polymers. Straight-chain olefins are of limited availability and prohibitive in cost. The instability of branched aliphatic polymer chains is reflected, for example, in alkylating and condensation reactions with benzene or toluene and results in degradation of the polymer chain during condensation. This degradation leads to the production of a mixture of phenyl alkanes containing compounds both lower and higher in aliphatic molecular weight than the olefin originally selected and desired. The instability and degradation of the olefin polymers in the presence of condensation catalysts under alkylating conditions also leads to the production of substantially inseparable polyalkylated aromatics of the same molecular weight and boiling range as the desired phenyl alkanes. This is a decided disadvantage since, upon conversion of such degraded mixtures to the sulfonated phenyl derivatives, relatively low yields have resulted. The sulfonated derivatives tend to be relatively poor in detergent quality and require costly purification treatment to eliminate or reduce odor, unsulfonatable residua, color bodies, and other impurities introduced by degradation caused by the original instability of the olefin polymer. Heretofore such deficiencies have seemed to be inherent in the branched-chain structure of olefin polymers, and the mixture of phenyl alkanes derived from such polymers have contained relatively large quantities of polyalkylated aromatics and unsulfonatable residua. At best these impurities have not been entirely separable and

2 have imparted undesirable odor or color to the sulfonated products.

An object of this invention is to produce an improved mixture of sulfonated phenyl substituted branched-chain alkanes of relatively high molecular weight and excellent detergency.

A further object is the production of a mixture of phenyl alkanes having a low unsulfonatable residue and a branched-chain structure.

Additionally, an object of the invention is to furnish phenyl alkanes convertible to sulfonated-phenyl alkane detergents of good color and having an exceptionally low content of deleterious degradation products or impurities.

Another object of the invention is to provide a novel mixture of phenyl sulfonate substituted alkanes having valuable detergent properties.

A further object is to produce an improved detergent comprising a mixture of phenyl alkane sulfonates of improved color and odor.

Other objects and advantages of the invention will become apparent from the following description and the drawings in which:

Figure 1 is a flow sheet illustrating in block diagram the major features and process steps for the production of a mixture of phenyl alkanes and conversion thereof to a phenyl-sulfonate substituted alkane mixture in accordance with the invention.

Figure 2:
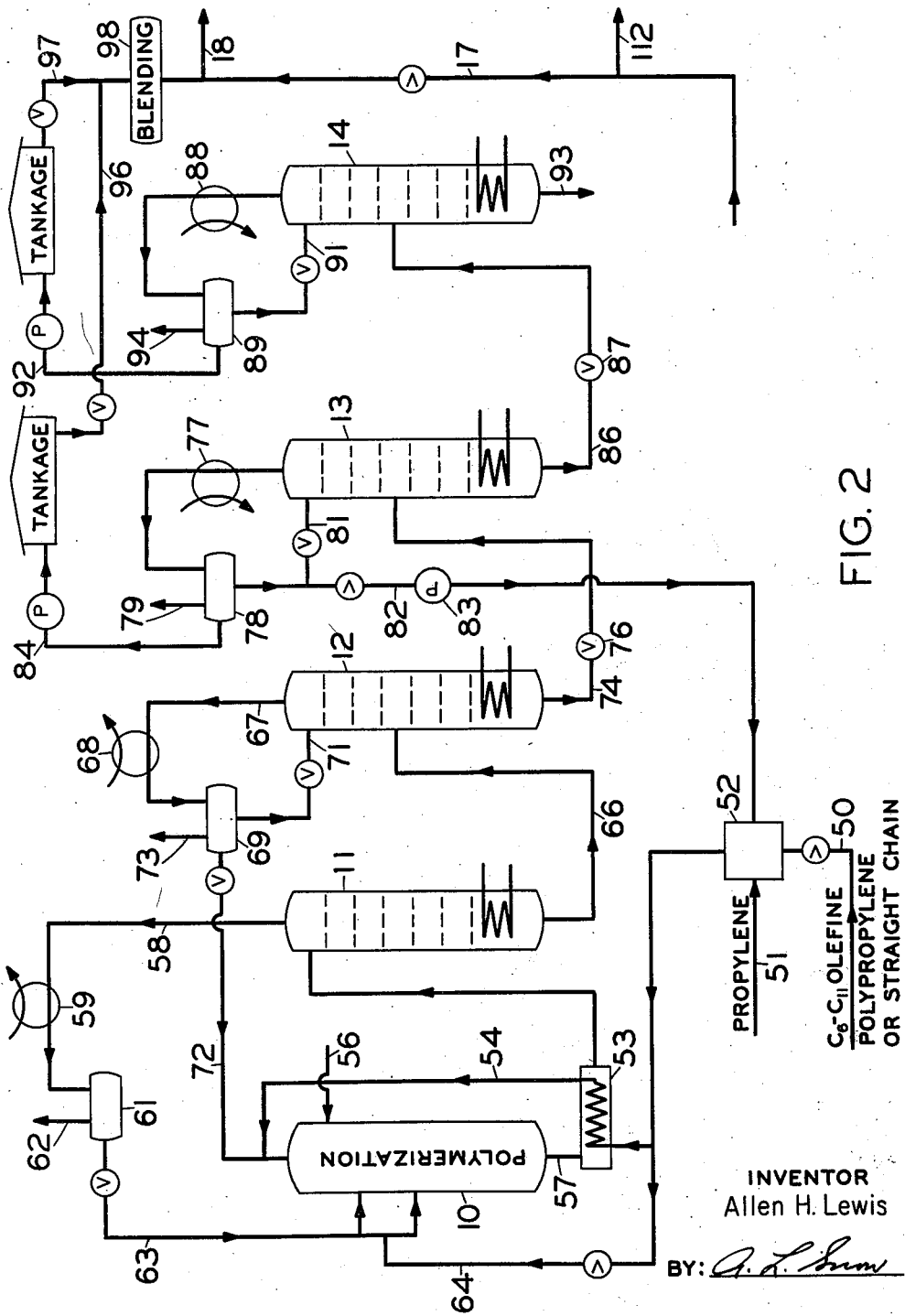
Figure 3:
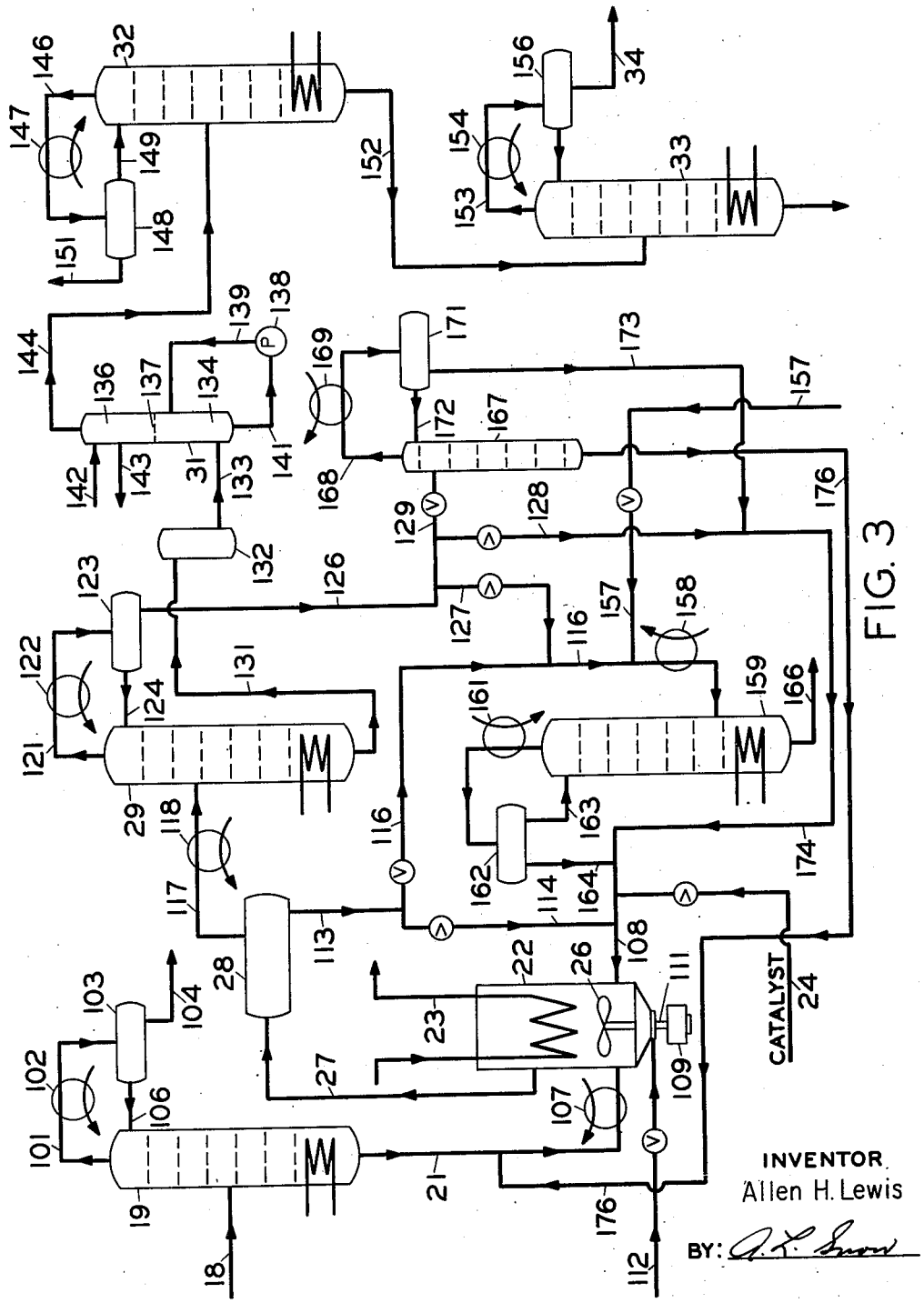
Figure 4:
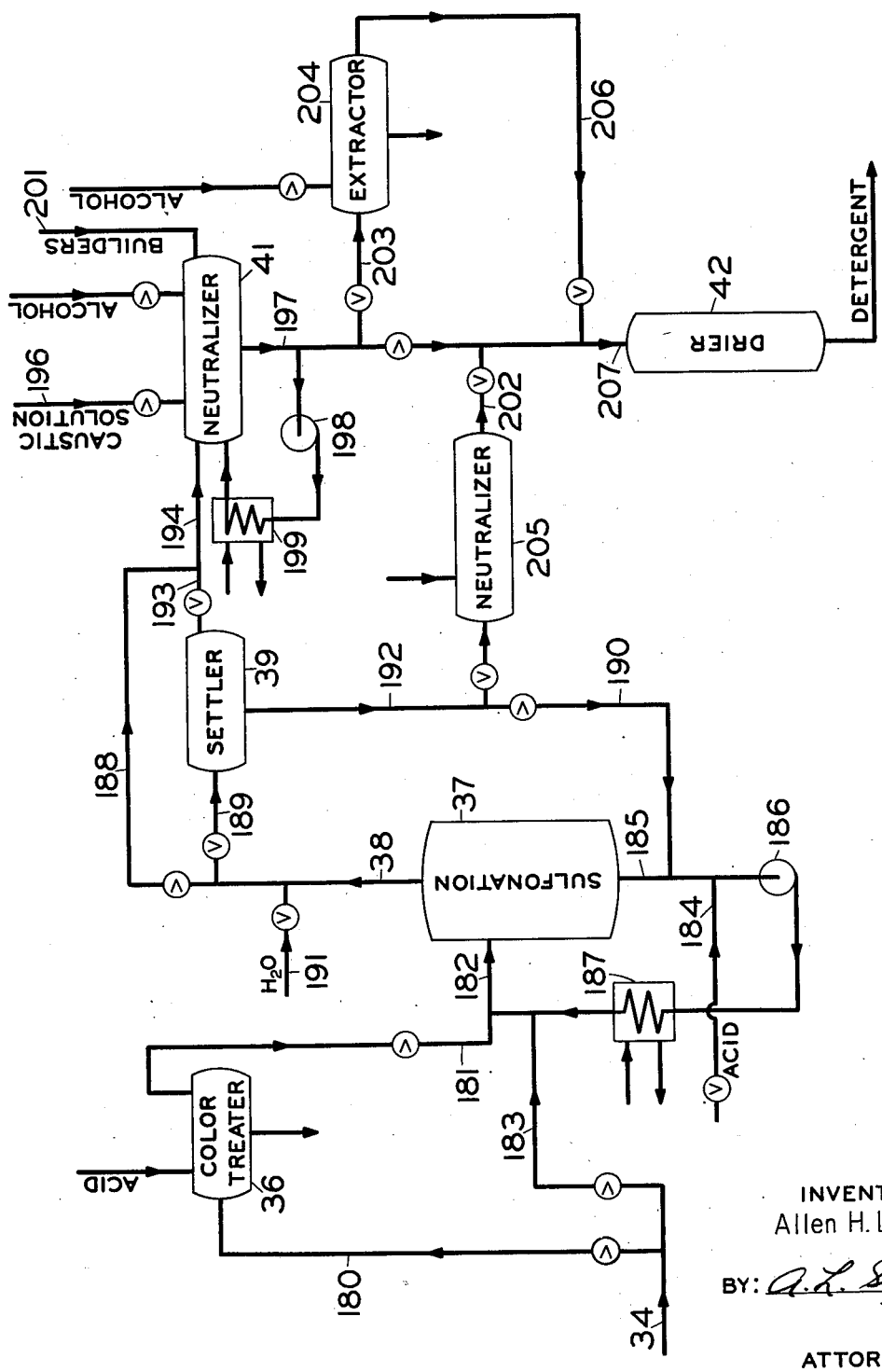

Figures 2, 3 and 4 when taken together and laid side by side from left to right in their respective order, show in diagrammatic form a process with the principal units of apparatus for conversion of propylene and benzene to an effective detergent.

It has been discovered that the foregoing objects can be accomplished by deriving a phenyl alkane from an olefin polymer, preferably a propylene polymer, in which the ratio of corrected optical density of the polymer at about 10.35 mu to corrected optical density at about 11.23 mu is greater than unity.

Aliphatic mono-olefin polymers satisfying the foregoing requirements can be obtained by polymerizing propylene, preferably in the presence of an excess of propylene dimer and of an acid polymerization catalyst. Propylene polymers, when characterized by a ratio of corrected optical densities as previously set forth, possess a branched-chain structure which has marked resistance to degradation or fragmentation in the presence of highly active alkylation or condensation catalysts, such as anhydrous hydrofluoric acid. The preferred propylene polymerization conditions utilize a phosphoric acid polymerization catalyst and yield a polymer mixture having a molecular weight predominantly in the $C_9$ to $C_{18}$ range, which mixture upon proper fractionation gives a high yield of mono-olefins of the desired branched-chain structure boiling within the range of 360 to 520° F.

It should be noted at this point that it is virtually impossible to define in terms of precise chemical structure the new mixture of compounds obtained according to this invention. However, the foregoing ratio of optical densities is definitive of chemical type structures of components of the mixture and is indicative of the relative proportions of different types of components contained therein, as will be apparent from the following discussion.

Infrared absorption bands are caused by natural vibrations of the molecules of a chemical compound. Each atom in a molecule is free to vibrate about the other atoms to which it is bonded and does it with a natural and characteristic frequency. As the molecule is irradiated with light of this frequency, energy is absorbed by the molecule causing it to vibrate and thereby diminishing the intensity of the light which is transmitted. Likewise, each pair or characteristic group of atoms in a molecule has its own natural modes or frequency of vibration. The difference between the absorption frequencies different chemical groups are often great enough to permit positive identification of the principal functional groups in a molecule. Thus, by irradiating a chemical compound or a mixture of compounds with infrared light to obtain the complete infrared absorption spectrum of the composition, one may obtain the sum of the contributions from all of the characteristic chemical or functional groups in the material and thereby determine its principal type components or features of chemical structure. Many of the correlations which have been made between molecular structures and frequencies of absorption bands are given in Table I.

*Table I* [1]

| Group | Wave Length, mu |
|---|---|
| C—H | 3.4 |
| O—H | 2.8 |
| C=C | 6.07 |
| $CH_2$ | 6.8 |
| $CH_3$ | 7.2 |
| $R-\underset{\underset{H}{\mid}}{C}=\underset{\underset{H}{\mid}}{C}-H$ | 10.0 and 11.0 |
| $R-\underset{\underset{H}{\mid}}{C}=\underset{\underset{H}{\mid}}{C}-R'$ | 10.35 |
| $R-\underset{\underset{R'}{\mid}}{C}=\underset{\underset{H}{\mid}}{C}-H$ | 11.25 |
| $R-\underset{\underset{R'}{\mid}}{C}=\underset{\underset{H}{\mid}}{C}-R''$ | 12.5 |

[1] Thompson and Torkington, Trans. Faraday Soc. 41, 246 (1945).

It has been found that infrared absorption and optical density in the 10.35 and 11.35 bands characterize olefin polymers having high resistance to fragmentation and degradation by anhydrous hydrofluoric acid.

The following data are illustrative:

*Table II*

| | $C_{12}$ Propylene Polymer | $C_{12}$ Mixed Butene Polymer | $C_{12}$ Butene-1 Polymer | $C_{12}$ Butene-2 Polymer |
|---|---|---|---|---|
| $D_c$ at 10.35 mu | 1.308 | 0.783 | 0.936 | 0.835 |
| $D'_c$ at 11.25 mu | 1.020 | 1.49 | 1.173 | 1.04 |
| $\frac{D_c}{D'_c}=R$ factor | 1.28 | 0.525 | 0.797 | 0.803 |
| $E_{mol}$ at 10.35 mu=Mol. Extinction Coefficient | 13.08 | 7.83 | 9.36 | 8.35 |

These data show that the ratio of corrected optical density ($D_c$) at 10.35 mu to corrected optical density to 11.25 mu is greater than 1 for olefin chains of polypropylene structure, whereas non-equivalent olefins, exemplified by polymers of the butenes are characterized by a value of less than 1 for the same ratio. This ratio of corrected optical densities at 10.35 mu and 11.25 mu is hereinafter termed "R factor."

Likewise, the foregoing data illustrate the fact that the desired olefins of polypropylene structure possess a molecular ($E_{mol}$) extinction coefficient greater than 10 and preferably greater than about 12 at 10.35 mu, whereas non-equivalent olefins have a molecular extinction coefficient less than 10 in this band.

The following test procedures are utilized for determining the above values.

TEST PROCEDURE FOR DETERMINING R FACTOR

Using an infrared spectrometer equipped with liquid cells of approximately 0.1 mm. in thickness, accurate optical density measurements of the olefin sample are made every .02 to .04 mu in the 10.35 mu absorption band (for example from 10.2 mu to 10.5 mu) and in the 11.25 mu absorption band (for example from 11.1 mu to 11.4 mu). An infrared spectrum is drawn plotting optical density as the ordinant v. wave length as the abscissae. The molecular weight and specific gravity of the olefin sample are measured by the usual methods. The optical density value corresponding to the peak of the absorbed band near 10.35 mu and near 11.25 mu are read from the spectrum, and each is corrected to a molecular weight basis of 100 and a specific gravity of 1 as follows:

$$D_c = \frac{D \text{(measured)} \times \text{(Mol. wt.)} \times 1}{\text{(Specific Gravity)} \times 100}$$

R factor is then determined as follows:

$$R = \frac{D_c \text{ at } 10.35 \text{ mu}}{D_c \text{ at } 11.25 \text{ mu}}$$

A value greater than unity for the R factor indicates a satisfactory propylene polymer and a polymer having a relatively high proportion of olefins with the structure:

$$R-\underset{\underset{H}{\mid}}{C}=\underset{\underset{H}{\mid}}{C}-R'$$

An R factor less than unity indicates a polymer which is subject to degradation and fragmentation in the presence of active alkylation or condensation catalysts and shows that the polymer mixture contains a relatively high proportion of olefins having the structure:

TEST PROCEDURES FOR DETERMINING MOLECULAR EXTINCTION COEFFICIENT

The optical density of the olefin sample corresponding to the peak of the absorption band near 10.35 mu is obtained as in the test procedure for determining R factor. From this measured optical density the measured molecular weight of the sample and the measured specific gravity, the molecular extinction coefficient is calculated as follows:

$$E_{mol}. \text{ at } 10.35 = \frac{D(\text{measured at } 10.35 \text{ mu}) \times (\text{Mol Wt.})}{1000 \times (\text{specific gravity}) \times (\text{thickness of sample in centimeters})}$$

Values greater than 10 for $E_{mol}$ at 10.35 mu and preferably greater than 12 indicate a satisfactory polymer having a relatively high concentration of olefins of the structure:

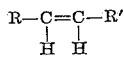

Non-equivalency of different branched-chain olefins in the HF alkylation of benzene are illustrated by the following:

Table III

| | R Factor | $E_{mol}$ at 10.35 mu | Alkylation Benzene and HF Yield C₁₈ Cut | Loss from HF Degradation and Side Reaction |
|---|---|---|---|---|
| C₁₂ Polypropylene | Greater than 1 | Greater than 10 | 80% | Less than 12%. |
| C₁₂ Polybutenes | Less than 1 | Less than 10 | Less than 30% | 50% Approx. |

Distinctions and non-equivalency of the resulting mixtures of phenyl alkanes after fractionation of the crude alkylate to separate a C₁₂ alkane derivative is illustrated by the data in Table IV:

Table IV

| | Color | Phenyl Sulfonate C₁₂ Alkane; Percent Yield | Unsulfonatable Residue |
|---|---|---|---|
| Polypropylene C₁₈ Alkylate | Good | 100% Approx | None. |
| Polybutene C₁₈ Alkylate | Poor | 75% | 25%. |

Even relatively small percentages of unsulfonated residue may impart an undesirable odor to the sulfonated product particularly on aging and such small odor-producing residua have not been successfully eliminated by any known procedure in various instances. These objectionable odors are especially to be avoided in the production of detergents. Additionally, last traces of color bodies frequently present in unsulfonatable residue are removable only with considerable difficulty, if at all.

Significant differences in chemical structure and composition of the mixed phenyl-sulfonate substituted alkanes of this invention are shown by the following data on detergency:

Table V

| | Detergency[1] |
|---|---|
| Polybutene phenyl-sulfonate (12 aliphatic carbons) | 1 |
| Polypropylene phenyl-sulfonate (C₁₂ alkyl) | 46 |

[1] Measured by relative whiteness of cleansed fabric.

As previously indicated the exact chemical constitution of the compositions produced according to this invention cannot be precisely defined. However, the infrared absorption spectrum clearly indicates that the olefins of polypropylene structure are largely of the type:

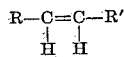

rather than

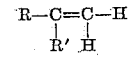

It appears necessarily to follow that the phenyl polypropylene alkanes and the sulfonates thereof are complex mixtures characterized by the branched-chain structure of polypropylene and a tertiary alkyl carbon atom at the benzene ring thus:

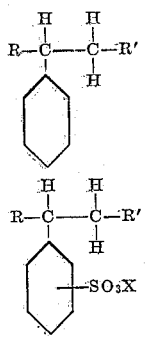

where X is hydrogen or a hydrogen equivalent of a metal.

On the contrary it necessarily appears that olefins of the structure

which characterize the polybutene mixtures must yield either degradation products of unknown constitution or by known laws of substitution will given phenyl alkanes in which the alkyl carbon atom at the benzene ring is quaternary rather than tertiary:

The new mixture of phenyl alkanes preferably are synthesized by condensation of benzene with a polypropylene of the desired structure and molecular weight in the presence of a hydrofluoric acid catalyst. Although aqueous concentrated hydrofluoric acid is not precluded, substantially anhydrous hydrogen fluoride is the preferred catalyst, and the condensation reaction may be carried out at temperatures of from about 0° F. to about 125° F., more desirably at from 50° to 100 °F. Other catalysts such as BF₃, mixtures of BF₃ and HF, AlCl₃ or H₂SO₄ are operative but less desirable.

The crude alkylate is fractionated to yield novel phenyl alkane compositions and preferably the desired fraction is sulfonated to yield an improved detergent as hereinafter disclosed.

Olefins of the preferred structure may be obtained by polymerization of substantially pure propylene under suitable conditions to form a complex mixture of alkanes having an average molecular weight corresponding to from about 12 to about 15 alkyl carbon atoms together with other higher and lower molecular weight polymers from which the $C_{12}$ to $C_{15}$ fraction desirably is separated. Mixtures of propylene with saturated low molecular weight hydrocarbons which do not enter the polymerization reaction may be used as a feed stock; for example, propylene containing propane, ethane and methane. Further, a mixture of such hydrocarbons containing ethylene is not precluded since the ethylene enters the reaction only to a minor extent. However, the propylene feed preferably should be substantially free of impurities, such as isobutenes, which tend to produce instability in the chain structure or to lower the R factor below unity and the molecular extinction coefficient below 10. Likewise, the amount of normal butene impurities should be kept at a minimum, for example, less than 1% by volume to maintain the R factor or molecular extinction coefficient at the optimum value.

A suitable feed stock for polymerization is pure propylene or a mixture such as the following:

| Component | Percent by Volume (Vapor) |
|---|---|
| Methane and Hydrogen | 12.2 |
| Ethene | 5.5 |
| Ethane | 29.1 |
| Propene | 21.6 |
| Propane | 30.5 |
| Isobutane | 0.6 |
| Butene (n) | 0.5 |
| Total | 100.0 |

One method of polymerizing the propylene feed to obtain the preferred type of alkene comprises contacting the hydrocarbon mixture with a phosphoric acid catalyst, for example, with a catalyst formed by saturating a support such as a kieselguhr or activated charcoal with 75% orthophosphoric acid. Catalyst temperature may vary from 300° F. to 500° F. and feed rate from 0.25 to 1.15 volumes of gas per volume of catalyst per hour. Pressure may be atmospheric although higher pressures are preferred, for example, 200 to 600 pounds per square inch. The resulting polymer product is a mixture of olefins from which the relatively stable acyclic branched-chain polypropylenes utilized in the present invention are obtained by close fractional distillation.

Preferably the polypropylenes to be converted to the final alkanes in accordance with this invention should boil within the range of from about 300° F. to 600° F., more desirably within the range of from about 325° F. to 520° F., and preferably within the range of from 360° F. to 520° F. At least about 50% of such polypropylene fractions preferably should boil above 380° F. It has been discovered that a mixture of polypropylenes having an initial boiling point of from 360° F. to about 370° F. and an end point of from 465° F. to about 520° F. with at least 50% boiling above about 390° F., upon conversion to the corresponding phenyl-sulfonate substituted alkanes yields a superior detergent. Again, the polymer mixture may be fractionated to yield a $C_{12}$ polypropylene cut having a boiling range from about 330° F. to about 420° F., at least about 50% of which boils above 350° F. and a $C_{15}$ polypropylene fraction having a boiling range of from about 420° F. to about 510° F., at least about 50% of which boils above 450° F. Each of these fractions may likewise be converted to phenyl alkanes and to the sulfonate derivative thereof. The foregoing boiling ranges are determined by an ASTM–D–86 standard distillation.

Unsaturation of the polymer fractions desirably should correspond substantially to that of the mono-olefins. Inspections of exemplary $C_{12}$ and $C_{15}$ polypropylene fractions are as follows:

EXAMPLE 1

*Tetramer*

| Test | Data |
|---|---|
| Boiling Range (760 mm.) ° F | 340–420 |
| Gravity (A. P. I.) degrees | 51.6 |
| Index of Refraction $n_D$ | 1.4370 |
| Viscosity at 100° F centistokes | 1.228 |
| Viscosity at 210° F do | 0.644 |
| Bromine Number | 92 |

EXAMPLE 2

*Pentamer*

| Test | Data |
|---|---|
| Boiling Range (760 mm.) ° F | 420–510 |
| Gravity (A. P. I.) degrees | 45.3 |
| Index of Refraction $n_D$ | 1.4502 |
| Viscosity at 100° F centistokes | 2.33 |
| Viscosity at 210° F do | 0.974 |

Distillation of the pentamer in a Stedman still gave the following results:

| Parts by Volume (liquid) Overhead | Vapor Temp., ° F. | Pressure (mm. Hg) | Equivalent Vapor Temp., ° F. at 760 mm. |
|---|---|---|---|
| 0 | 209 | 23 | 400 |
| 10 | 218 | 23 | 410 |
| 70 | 222 | 19 | 428 |
| 130 | 230 | 18 | 438 |
| 190 | 237 | 17 | 450 |
| 320 | 257 | 15 | 480 |
| 350 | 266 | 15 | 491 |
| 380 | 280 | 15 | 510 |

The following additional distillations exemplify typical molecular weight distributions of selected polypropylene fractions possessing an R factor greater than 1 and a molecular extinction coefficient greater than 10.

EXAMPLE 3

| Percent by Volume Overhead | $C_{12}$ Fraction Temp., ° F.[1] | $C_{15}$ Fraction Temp., ° F.[1] | $C_{12}$–$C_{15}$ Mixture Temp., ° F. (ASTM–D–86) |
|---|---|---|---|
| Start | 325 | 400 | 369 |
| 5 | 339 | 403 | 376 |
| 10 | 342 | 406 | 379 |
| 20 | 344 | 411 | 382 |
| 30 | 346 | 418 | 386 |
| 40 | 349 | 425 | 389 |
| 50 | 354 | 434 | 394 |
| 60 | 359 | 445 | 400 |
| 70 | 364 | 467 | 407 |
| 80 | 368 | 473 | 418 |
| 90 | 380 | 491 | 438 |
| 95 | 390 | 501 | 460 |
| End Point | 400 | 510 | 472 |

[1] These are vapor line temperatures.

Olefins of the foregoing structures and molecular weight distribution are condensed with an aromatic hydrocarbon of the benzene series in the presence of a hydrofluoric acid catalyst, as previously stated, to form the mixture of phenyl alkanes of this invention. Condensation of the olefin with benzene is preferred but toluene or xylene also is embraced within the broader aspects of the invention. Likewise, the invention also includes in its broader aspects condensation of the olefins with benzene sulfonic acid, that is to say, sulfonation of the benzene nucleus can be effected before rather than after the alkylation or condensation stage of the process, although such procedure is presently regarded as less desirable.

A hydrofluoric acid catalyst has been found highly advantageous for effecting the foregoing condensation reactions of polypropylenes with benzene, despite the fact that prior literature and experience indicates that this catalyst acts severely to decompose branched-chain olefins into shorter chain fragments during the condensation reaction. When the olefin is of the structure and composition herein disclosed, the condensation reaction goes smoothly with minimum formation of undesirable side reaction products characteristic of chain fragmentation or degradation.

As indicated in Fig. 1 of the drawing, benzene, hydrofluoric acid catalyst and the selected polypropylene fraction are passed to an alkylation stage where the exothermic condensation or alkylation reaction occurs. The temperature desirably is maintained between from about 50° F. to about 100° F. by indirect cooling of a closed reaction chamber. Relatively large amounts of hydrofluoric acid such as 200 to 800 mol per cent based on the olefin are suitable. Since the olefin is relatively expensive, an excess of the benzene is usually adopted to effect more complete conversion of the polypropylene to phenyl alkane and to minimize a condensation of two or more olefin molecules with the same aromatic nucleus. Upon completion of the reaction the hydrofluoric acid catalyst is separated from the alkylation mixture, as by vaporization, and residual traces thereof may be removed by washing with aqueous alkali.

Following the line of flow in Fig. 1, the alkylation mixture is distilled first to remove excess benzene (which is recycled to the alkylation stage) and then to separate as overhead the monophenyl alkanes boiling within the range of 370 to 650° F. The preferred phenyl alkanes of this invention boil within the range of from about 475° F. to about 650° F. and more desirably within the range of from about 500° F. to about 625° F. Despite the fact that an excess of benzene is utilized during the alkylation reaction, some readily separable heavy dialkyl benzenes are formed containing two $C_{12}$ polypropylene chains on a single benzene nucleus. These heavy dialkyl benzenes are separated as distillation bottoms and may be withdrawn from the system or in some instances recycled to the alkylation stage as indicated by the dotted flow line of Fig. 1.

In those cases where the original olefin is a polypropylene having an R factor greater than 1 and a molecular extinction coefficient greater than 12, it has been found that the phenyl alkane overhead fractions boiling within the ranges above indicated are of superior purity. These alkanes are substantially free of objectionable color bodies, yield little or no unsulfonatable residue, and contain substantially the same number of carbon atoms in the single alkane chain of the molecule as were present in the original alkene. The relatively high purity and stability of the phenyl alkane products of the reaction makes possible the production of sulfonates and other derivatives without the necessity for decolorizing treatments with adsorbents or stabilization by sulfuric acid treatment which heretofore has complicated the production of such derivatives. Also, it has been found that the high purity and stability of the phenyl alkanes of this invention yields sulfonates which are relatively free of undesirable odor not only immediately after their production but after long periods of storage during which time various other sulfonates derived from petroleum raw materials have developed objectionable odors.

In practicing the invention according to Fig. 1 of the drawing, the phenyl alkane fraction is next sulfonated with any suitable sulfonating agent, such as chloro-sulfonic acid or, preferably, a fuming sulfuric acid. A suitable sulfonating agent is from 5 to 25% fuming $H_2SO_4$ in the ratio of from 2 to 5 mols of acid per mol phenyl alkane. About 3 mols of acid per mol of alkane is preferred. The temperature during initial stages of the sulfonation reaction desirably should be kept below 115° F. by cooling and adding the acid slowly to the phenyl alkane. To obtain substantially complete reaction temperatures above about 90° F. should be reached; up to about 140° F. is permissible. Thorough agitation should be maintained, and local overheating avoided to minimize or prevent side reactions during the sulfonation. The spent acid layer may be separated from the sulfonic acids by stratification either with or without addition of water, and the acid discarded. A desired amount of the acid layer may be neutralized and returned to the sulfonated hydrocarbon mixture as indicated by dotted lines to control sodium sulfate content thereof.

The sulfonated hydrocarbons are next sent to a neutralization stage where caustic alkali solution is added to form the sodium salt of the sulfonic acid radical now attached to the phenyl group of the alkane by reason of the sulfonation treatment. The neutralized phenyl-sulfonate substituted alkane flows in the form of an aqueous slurry or paste to a suitable drier where the finished detergent product is obtained.

The sulfonate product is a complex mixture of substituted alkanes in which the alkane portion of the molecule corresponds substantially in molecular weight and structure to that of the original olefin. The phenyl sulfonate substituent on the alkane chain furnishes a polar group which is correctly balanced with the non-polar hydrocarbon structure to yield an excellent detergent. This sulfonate detergent may be used in substantially pure form but is preferably compounded with builders, additives, auxiliary detergents or the like.

One particularly desirable form of detergent is produced by drum-drying or spray-drying slurry containing sodium sulfate and the neutralized phenyl sulfonated substituted alkanes in proportions to yield a dried product containing from about 50 to about 70% by weight, preferably 55 to 65% by weight of sodium sulfate. Other inorganic builders such as tetrasodium pyrophosphate, sodium silicate, trisodium phosphate and the like may be incorporated in detergent compositions containing the mixed sulfonates herein disclosed. A typical composition is as follows:

EXAMPLE 4

| | Per cent by weight |
|---|---|
| Sulfonate | 31 |
| Sulfate | 58 |
| Tetrasodium pyrophosphate | 10 |
| Sodium silicate | 1 |

Additionally, organic additives may be incorporated in compositions such as the foregoing to enhance the detergency action of the sulfonate on difficult fabrics or stubborn soils. One such suitable additive is a carboxymethyl cellulose sodium salt. This composition may be derived from cellulose by reaction of alkali cellulose with chloracetic acid to form a carboxylic ether which is converted to the sodium salt. A suitable composition is available in commercial form under the name "Carboxymethyl Cellulose Sodium Salt" (medium viscosity grade). From 1 to 20% of this additive may be incorporated in a detergent mixture containing about 60% sodium sulfate and 40% sulfonate detergent. It has been found, for example, that 3-5% of this additive in such a detergent mixture increases per cent soil removal from about 40% to about 70% in a standard but severe detergency test at 0.2% concentration of the detergent in hard water. In a similar test at the same concentration, ordinary soap gave only about 15% soil removal.

Reference to Figures 2, 3 and 4 of the drawing will reveal a detailed flow sheet illustrating an embodiment of the invention, wherein production of a suitable olefin from propylene is effected in Fig. 2, the olefin and benzene are converted to the desired phenyl alkane in Fig. 3, and the alkane is sulfonated and neutralized to yield the desired detergent in Fig. 4. These three figures when placed side by side from left to right in numerical order form a complete flow sheet of a preferred process.

Beginning with Fig. 2 there is provided a polymerization chamber 10 from which the reaction mixture is passed first to a stripper 11 for removing the more volatile components such as fixed gases and then to a fractionator 12 for separating $C_{11}$ and lower olefins as overhead. A second fractionator 13 receives the bottoms from fractionator 12 and separates a $C_{12}$ olefin mixture as an overhead fraction. Final fractionator 14 separates the bottoms from fractionator 13 into a $C_{15}$ olefin mixture as overhead and heavier than $C_{15}$ hydrocarbons as bottoms. When desired fractionators 13 and 14 may be combined into one fractionation stage with separation of a single mixed $C_{12}$ to $C_{15}$ olefin cut.

A mixture of $C_{12}$ to $C_{15}$ olefins obtained either by blending the separate $C_{12}$ and $C_{15}$ fractions or from the single stage $C_{12}$ to $C_{15}$ fractionator is fed to the alkylation stage of Fig. 3 by way of line 16 and an excess of benzene by valve-controlled inlet line 17. The two hydrocarbon components are mixed in line 18 after which they are dehydrated in fractionating column 19. The dehydrated hydrocarbon mixture then flows by way of line 21 to a sealed contactor 22 provided with a cooling coil 23 for controlling reaction temperature.

Hydrofluoric acid catalyst is introduced into contactor 22 by way of feed line 24 and is intimately contacted with the hydrocarbon reactants by the vigorous action of agitator 26. The hydrofluoric acid catalyzes the condensation of the polypropylene with the benzene feed to form monophenyl alkanes of the type previously described. Temperature is controlled and exothermic heat of reaction removed by circulating any suitable refrigerant through cooling coil 23.

As the reaction mixture flows upwardly through contactor 22, it passes by way of discharge line 27 to settler 28 where the upper oily phase is withdrawn and conveyed to a fractionator 29 for vaporizing residual volatile catalysts. The residual oily phase is then passed from the bottom of the fractionator 29 through a caustic washing at 31 and is next fractionated to remove excess benzene in distillation column 32. To recover the desired phenyl alkane, distillation bottoms from column 32 are fractionated in column 33 and the phenyl alkane to be sulfonated is recovered as overhead. This phenyl alkane overhead flows from distillation column 33 by way of line 34 to the sulfonation system of Fig. 4.

The phenyl alkane flowing by way of conduit 34, when desired, may be subjected to a preliminary color extraction stabilizing treatment in a contactor at 36 or this contactor may be bypassed and the phenyl alkane sent directly to sulfonator 37. The sulfonated reaction mixture passes by way of overflow line 38 to settler 39 when it is desired to remove excess acid, and the sulfonic acid phase then flows to neutralizer 41. Upon addition of caustic soda to the sulfonic acids in neutralizer 41, the sodium sulfonates thereby formed pass to a spray dryer 42 with or without further treatment subsequently to be described. The dried detergent preferably is promptly packaged as a finished article of commerce.

The foregoing is a general description of the process represented by Figures 2, 3 and 4 of the drawing. In order to facilitate practice of the invention and design of a suitable commercial plant, the following more specific description is submitted.

Referring to Fig. 2, propylene only may be fed or, as here shown, $C_6$—$C_{11}$ olefins selected from the group consisting of straight-chain olefins and polypropylene are fed by way of inlet line 50 together with propylene by way of inlet line 51 to mixer 52. The resulting olefin mixture then passes through preheater 53 and feed line 54 to a fixed bed solid phosphoric acid catalyst in polymerization chamber 10. Steam also is introduced into the polymerization chamber by way of line 56 in a quantity sufficient to maintain a partial pressure of water vapor equal to that of the phosphoric acid catalyst in order to prevent dehydration of the catalyst which is maintained at the desired reaction temperature by heat of reaction. Inter-polymerization of the propylene with the $C_6$ to $C_{11}$ olefins, preferably polypropylene, is effected upon contact with the polymerization catalyst, as they flow downwardly through the catalyst bed, and the resulting polymerized mixture is then conducted by way of conduit 57 through heat exchanger 53 to stripper column 11 where low boiling hydrocarbons are removed as overhead through line 58. The gases removed in stripper 11 comprise mostly propane and propene together with other hydrocarbons containing less than five carbon atoms. The stripped gas flows through cooler 59 to collecting drum 61 where uncondensed gases may be discharged by way of vent line 62.

In order to regulate the temperature developed by exothermic heat of reaction in the polymerization zone, a controlled portion of the cooled gases and any condensate formed in drum 61 is conveyed by way of valve controlled line 63 and introduced into the polymerization zone as a diluent and cooling gas. To further facilitate control of reaction temperature, valve-controlled conduit 64 is provided for by passing some of the reaction feed directly to the polymerization zone without preheating by heat exchange in preheater 53.

The polymerized mixture, stripped of $C_5$ and lighter gases, flows from the bottom of column 11 by way of conduit 66 to the first fractionator 12 where light olefin polymers in the $C_6$ to $C_{11}$ range are separated as a vapor phase overhead, which passes by way of outlet conduit 67 through condenser 68 to condensate drum 69. Fractionation is controlled and improved by returning a portion of the condensate from drum 69 to fractionator 12 by way of valve-controlled reflux line 71.

To increase the yield of $C_{12}$ to $C_{15}$ olefins, it is sometimes desirable to return at least a portion of the $C_6$ to $C_{11}$ olefins (separated in fractionator 12) by way of valve-controlled line 72 to polymerization zone 10 and thereby cause inter-polymerization of these lower polymers with the propylene feed to yield additional $C_{12}$ to $C_{15}$ olefins. Excess $C_6$ to $C_{11}$ olefins may be withdrawn by means of discharge line 73.

The $C_{12}$ and higher boiling olefin polymers pass downwardly through fractionating column 12 and out discharge line 74 through pressure reducing valve 76 to fractionator 13 where a $C_{12}$ olefin fraction boiling, for example, from about 330° F. to about 420° F. at atmospheric pressure is taken overhead through condenser 77 and collected in condensate drum 78. This fractionation preferably is effected under vacuum which is maintained through vacuum line 79 connected to a vacuum pump, steam ejector, or other suitable means for maintaining the required subatmospheric pressure. A portion of the condensate may be returned as reflux to fractionator 13 through valve-controlled reflux line 81. It is sometimes found desirable to recycle another portion of the $C_{12}$ olefin cut by way of valve-controlled line 82 through pump 83 to inlet feed mixer 52. The remainder of the $C_{12}$ olefin cut is pumped through conduit 84 to tankage for blending with the $C_{15}$ olefin cut obtained in the next fractionation stage.

The $C_{15}$ and higher boiling olefins flow downwardly through fractionating column 13 and are discharged by way of line 86 through pressure reducing valve 87 into fractionator 14 where a $C_{15}$ olefin fraction boiling, for example, from about 420° F. to about 500° F. at atmospheric pressure is taken overhead through condenser 88 to condensate drum 89. A portion of the condensate may be returned to fractionator 14 by way of valve-controlled reflux line 91, and the remainder pumped to tankage through line 92 for blending with the $C_{12}$ fraction. Bottoms from fractionator 14 are discharged to outlet line 93.

It is preferred to operate fractionating column 14 as well as column 13 under vacuum in order to avoid deterioration of the $C_{12}$ to $C_{15}$ olefins by decomposition or further polymerization. Desirably, fractionator 14 is maintained at higher vacuum than fractionator 13 by means of a vacuum line 94 on condensate drum 89 and connected to any suitable device for maintaining reduced pressure, such as vacuum pump, or steam ejector.

To illustrate suitable operations in the foregoing process, exemplary polymerization conditions are:

EXAMPLE 5

Temperature of fresh feed___ 350–425° F.
Temperature of catalyst_____ 375–500° F. (preferably 400–460° F.).
Pressure _____ 200–600 lbs./sq. in.
Propylene feed (as liquid)___ .02–0.2 v./v./hr.
Catalyst _____ 100–110% orthophosphoric acid on kieselguhr.

A typical feed stock will contain other normally gaseous hydrocarbons in various proportions, such as the following:

EXAMPLE 6

| Hydrocarbon | Volume Percent |
|---|---|
| Ethylene | 3.2 |
| Ethane | 2.6 |
| Propylene | 16.0 |
| Propane | 57.5 |
| Butene (impurity) | 0.1 |
| Butane | 3.7 |

The remaining 16.9% of the feed stock may be $C_6$ to $C_{11}$ propylene polymers previously formed by polymerization under substantially the same conditions or it may be a mixture of $C_6$ to $C_{11}$ normal olefins as previously indicated.

The effect of the amount of $C_6$ to $C_{11}$ propylene polymers on the yield of $C_{12}$–$C_{15}$ interpolymers obtained with propylene is illustrated by the following data:

EXAMPLE 7

| Relative Volume Propylene in Feed | Relative Volume $C_6$ to $C_{11}$ in Feed | Percent $C_{12}$ to $C_{15}$ Olefin in Polymer |
|---|---|---|
| 1.0 | 0 | 24 |
| 1.0 | 0.5 | 57 |
| 1.0 | 1.0 | 71 |
| 1.0 | 2.2 | 89 |

At least about 0.2 liquid volume of $C_6$ to $C_{11}$ polypropylene per liquid volume of propylene is desirable. More than ten volumes per volume of propylene usually is not warranted. In the foregoing runs the average temperature of catalyst was 430° F.; pressure, 200 pounds per square inch gauge; and propylene feed rate .032 v./v./hr. Higher pressures increase the yield of $C_{12}$ to $C_{15}$ olefin interpolymers as illustrated by the following data:

EXAMPLE 8

| Pressure | Space Rate v./v./hr. | Yield Percent Based on Propylene Feed |
|---|---|---|
| 200 lbs./sq. in | 0.74 | 81 |
| 500 lbs./sq. in | 0.74 | 110 |
| 200 lbs./sq. in | 0.32 | 92 |
| 500 lbs./sq. in | 0.32 | 121 |

In some situations it is, therefore, preferred to operate the process at 400 to 600 pounds per square inch pressure. In these latter runs, average catalyst temperature was 430° F., and the ratio of $C_6$ to $C_{11}$ olefins to propylene was approximately 2.2:1.

Although the $C_{12}$ and the $C_{15}$ olefin fractions may be alkylated separately, preferably a blend of from 60 to 80% of the foregoing $C_{12}$ olefin fraction with from 40–20% of the $C_{15}$ fraction is prepared by conveying these respective olefins from tankage by way of valve-controlled outlet lines 96 and 97 to blending tank 98. The blended olefin, boiling within the ranges herein disclosed, then flows together with benzene from valve-controlled benzene feed line 17 by way of sulfonation inlet conduit 18 to the alkylation stage of Fig. 3.

The benzene olefin mixture from the polymerization system is first dehydrated in fractionating column 19 of Fig. 3. This dehydrating column is operated under total reflux. In such an operation, water together with a portion of the hydrocarbons is vaporized overhead, passes through line 101 to condenser 102, and the condensate collected and allowed to stratify in condensate drum 103. The lower water layer is removed by line 104 and the hydrocarbon layer returned to fractionating column 19 by way of reflux line 106. The dehydrated hydrocarbon feed passes from the bottom of column 19 through outlet conduit 21 and cooler 107 to reactor 22. Condensation of the polypropylene with the benzene is effected by catalysis with hydrogen fluoride in reactor 22, and the temperature is controlled by indirect heat exchange with any suitable refrigerant introduced through cooling coil 23 as indicated.

Inasmuch as the hydrofluoric acid catalyst which may be introduced through fresh catalyst feed line 24 is not miscible with the hydrocarbon reactants, it is important that intimate contact between the hydrocarbon and hydrofluoric acid phases be effected by vigorous agitation. As here shown, an agitator 26 is provided and is driven by motor 109 connected thereto by shaft 111 passing through the bottom of reactor 22. In the construction of this agitator it has been found advantageous not only to provide a hydrofluoric acid resistant bearing and packing for shaft 111, but also to flush this bearing and packing with fresh benzene admitted by way of valve-controlled line 112 whereby minimum exposure to the action of hydrofluoric acid is obtained.

After the hydrogen fluoride catalyzed condensation has been effected in reactor 22, the reaction mixture is passed through overflow conduit 27 to settler 28 where a lower hydrofluoric acid phase and an upper hydrocarbon phase are formed. The lower acid phase is withdrawn from the bottom of settler 28 through conduit 113 and may be recycled to the reactor by way of valve-controlled return line 114 or passed to the hydrofluoric acid purification unit, hereafter described, by way of valve-controlled line 116.

The oil phase in the upper portion of settler 28 contains the excess benzene as well as some hydrofluoric acid together with the condensation reaction products. This oil phase is continuously withdrawn through overflow 117 and passes through heater 118 to benzene stripping column 29 where benzene and hydrofluoric acid are vaporized as overhead and are conducted through line 121 and condenser 122 to condensate drum 123. In order to improve the separation of benzene a portion of the hydrocarbon distillate collected in condensate drum 123 may be returned to stripper 119 by way of reflux line 124. The benzene-hydrofluoric acid mixture is withdrawn from condensate drum 123 through line 126 and may be processed as hereinafter described in more detail in one of three ways; namely, by passing the mixture through valve-controlled line 127 to the hydrofluoric acid recovery system, by recycling directly to reactor 22 through valve-controlled return line 128, or by feeding the benzene-hydrofluoric acid mixture through valve-controlled line 129 to a suitable fractionator for separating the two components.

Returning now to the benzene stripper 29, the hydrocarbon reaction mixture stripped of its benzene and most of the hydrofluoric acid contained therein flows from the bottom of said stripper through outlet line 131 to a lime or bauxite packed treater 132. In order to facilitate continuous operation, two or more of these treating chambers may be connected in parallel so that one may be replenished while the other is on stream. The lime or bauxite in treater 132 serves to remove a major portion of residual hydrofluoric acid, and may partially decompose or remove any organic fluorides formed in previous stages of the process. The treated hydrocarbon mixture flows from the bottom of treater 132 through line 133 to caustic washer 31 where final traces of organic fluorides are decomposed or extracted.

Washer 31 contains a lower aqueous caustic layer 134 and an upper water layer 136. The interface between these two layers is indicated by dotted line 137. Desirably aqueous caustic is introduced by pump 138 at washer inlet pipe 139 in the upper zone of the aqueous alkali layer and circulated downwardly to pump return line 141. Fresh caustic may be introduced and spent caustic discharged by suitable connections not shown. Water is likewise preferably circulated from upper inlet 142 to lower outlet 143 in order to provide a countercurrent washing action for removing any entrained caustic. Thus, the hydrocarbon feed introduced by line 133 flows upwardly through first an aqueous caustic, then through a water layer in washer 31 to outlet conduit 144 and fractionator 32.

Lower-boiling hydrocarbons are separated and the reaction mixture reduced to the desired initial boiling point by vaporization in fractionator 32. The vapor-phase hydrocarbons are taken as overhead through line 146 and condenser 147 to condensate drum 148. Improved fractionation is obtained by returning a portion of the condensate through reflux line 149 to fractionator 32. Condensed hydrocarbons are removed from the condensate drum by way of line 151 and may, when desired, be recycled to reactor 22. The remaining hydrocarbons consisting essentially of monophenyl alkanes and having an initial boiling point within the range, for example, of from 350 to 370° F. are passed from the bottom of fractionator 32 through line 152 to fractionator 33.

Monophenyl alkane product is distilled overhead from fractionator 33 through line 153 and condenser 154 to condensate drum 156. Product having an initial boiling point as above described and an end point, for example, of from 600 to 610° F. is withdrawn by way of line 34 and passed to the sulfonation stage described in connection with Fig. 4. Before proceeding with a description of the sulfonation of this monophenyl alkane product, the hydrofluoric acid recovery system of Fig. 3 will be described.

In the continuous operation of the hydrofluoric acid catalyzed alkylation or condensation system, the hydrofluoric acid catalyst becomes contaminated with water and acid oil until its efficacy as a catalyst is substantially diminished despite the fact that the hydrocarbon feed is carefully dehydrated as described. Thus, the hydrofluoric acid layer separated in settler 28 becomes an aqueous mixture which must be either discarded or be suitably treated to recover and purify the same. In a preferred operation, this acid layer or a portion thereof is either intermittently or continuously conducted to a purification unit by way of valve-controlled line 116.

Purification and recovery of the contaminated hydrofluoric acid presents a problem by reason of constant boiling mixtures which the acid forms with its contaminants. In order to facilitate recovery and purification, fresh benzene is introduced by way of valve-controlled line 157 into the aqueous mixture of line 116 and passed through preheater 158 to fractionating column 159. In this column benzene acts as a stripping agent and carries hydrogen fluoride as vapor phase overhead through condenser 161 to condensate drum 162. A portion of the condensate is returned as reflux through line 163 to fractionating column 159. The remaining hydrogen fluoride-benzene condensate is recycled via line 164 to reactor 22. Bottoms from fractionator 159 comprise a constant boiling mixture of hydrofluoric acid and water together with acid oil contaminants and are withdrawn through discharge line 166. Fractionating column 159 thus effects a split between benzene and hydrofluoric acid on the one hand and a constant boiling aqueous hydrofluoric acid mixture on the other hand.

Instead of, or in addition to, the fresh benzene fed to fractionator 159 by way of line 157, the benzene hydrofluoric acid mixture from benzene stripper condensate drum 123 may be introduced by way of valve-controlled line 127 into HF recovery line 116 as previously indicated. The relatively large excess of benzene in the mixture from condensate drum 123 serves as a stripping agent and permits economy in the use of fresh benzene.

Alternatively, a portion or all of the benzene-hydrofluoric acid mixture from benzene stripper condensate drum 123 may be passed through valve-controlled line 129 to fractionator 167 where fractional distillation effects separation of the benzene and the hydrofluoric acid. The vapor phase hydrofluoric acid passes overhead through line 168 and condenser 169 to condensate drum 171. The fractionator may be operated under reflux by returning a portion of the condensate through reflux line 172. Hydrofluoric acid from condensate drum 171 is recycled to reactor 22 by way of line 173 and return line 174 to catalyst inlet 108. Benzene from the bottom of fractionator 167 is recycled to reactor 22 through return line 176.

Exemplary operating data for the manufacture of monophenyl alkanes in accordance with the foregoing process stage and utilizing anhydrous hydrofluoric acid as a catalyst are:

EXAMPLE 9

*Operating Conditions (continuous process)*

Aromatic feed _____ Benzene
Propylene polymer feed:
  Initial boiling point (ASTM) _____°F__ 362
  End point (ASTM) _____°F__ 464
  Gravity (A. P. I.) _____ 47.1
  Bromine number _____ 103.1
Feed mixture:
  20.2 vol. per cent benzene
  79.8 vol. per cent polypropylene
  (10 : 1 benzene to polymer mol ratio)
Reaction conditions:
  Temperature: 50° F.
  Stirrer speed: 2250 R. P. M.
  Hydrocarbon feed rate: 2856 vol./hr.
  Olefin vol. per vol. of catalyst per hour: 0.55
  Catalyst replacement rate: 0.26 vol. of 100% HF per vol. of polymer to maintain 79% HF
Crude reaction mixture:
  Bromine number: 0.9
  Per cent F: nil to 0.1

Crude phenyl alkanes (ASTM distillation):
  Vol. per cent lighter than 520° F.: 7.5
  Vol. per cent boiling 520° F. to 600° F.: 86.0
  Vol. per cent bottoms (boiling above about 600° F.): 6.5%
Yields:
  Vol. crude phenyl alkanes per vol. of polymer__ 1.19
  Vol. benzene consumed per vol. polymer fed____ 0.354
  Vol. polymer loss to acid oil per vol. polymer fed _____ 0.08
  Vol. benzene loss to acid oil per vol. polymer fed _____ 0.015
  Vol. crude phenyl alkanes per vol. benzene used_ 3.34
  Vol. finished phenyl alkanes per vol. polymer fed _____ 1.02

In order to guide those skilled in the art in the chemistry of the process and of the compositions of this invention, and to more adequately illustrate the preparation of monophenyl alkanes from $C_{12}$ and from $C_{15}$ polypropylene fractions, the following simplified specific examples are given:

EXAMPLE 10

One hundred milliliters of benzene (87 grams) and 270 grams of anhydrous hydrofluoric acid were placed in a stainless steel, closed reaction flask equipped with a metal stirrer and immersed in an ice bath. A feed stock consisting of 227 grams of an acyclic propylene tetramer and 527 grams of benzene was added over a period of 15 minutes while stirring continuously. The reaction mixture was stirred for an additional four hours at ice bath temperature and then neutralized with an aqueous potassium hydroxide solution to remove the hydrofluoric acid catalyst. The aqueous layer was separated from the crude reaction product and discarded. After drying over sodium bicarbonate and filtering, 790.5 grams of crude reaction product was obtained (yield=94%). This crude reaction product was distilled to obtain the monophenyl alkane fraction as follows:

| Fraction | Distillation Range at 760 mm. (Vapor Line Temp.) | Volume, Percent |
| --- | --- | --- |
| Benzene fraction | 175–450° F. | 61 |
| Monophenyl dodecane fraction | 450–623° F. | 33 |
| Bottoms | 623° F.+ | 6 |

In separating the monophenyl alkane, the foregoing distillation was actually carried out at 3 mm. pressure. It will be seen that the yield of monophenyl alkane was 80.8% of theoretical. The bottoms fraction consisted of phenyl alkanes in which two of the original alkenes condensed with a single aromatic nucleus and about 16% of the original alkene went into the production of these compounds. Loss to benzene overhead was only about 3.2%.

Inspections of the monophenyl alkane were:

Gravity (A. P. I.) _____ 30.9
Refractive index $n_D^{20}$ _____ 1.4884
Specific dispersion _____ .128
Viscosity at 100° F. _____centistokes__ 6.60
Viscosity at 210° F. _____do____ 1.80

This product was essentially a mixture of isomeric monophenyl dodecanes of polypropylene structure believed to contain approximately five methyl groups in the alkane portion of the molecule.

The propylene tetramer fraction utilized in the preparation of the foregoing compound had an A. P. I. gravity of 51.5, a bromine number of 85, and a boiling range of 325° F. to 400° F. Distillation of this tetramer revealed the following distribution of isomeric dodecenes according to the boiling range:

| Percent Over | Temperature, °F. (corrected to 760 mm.) |
|---|---|
| Start | 325 |
| 5 | 339 |
| 10 | 342 |
| 20 | 344 |
| 30 | 346 |
| 40 | 349 |
| 50 | 354 |
| 60 | 359 |
| 70 | 364 |
| 80 | 368 |
| 90 | 380 |
| 95 | 390 |
| 100 | 400 |

Example 11

825 grams of benzene and 266 grams of anhydrous hydrofluoric acid were placed in a stainless steel flask equipped with a metal stirrer and cooled by an ice water bath as in Example 10. A feed stock consisting of 861 grams of propylene tetramer fraction and 1106 grams of benzene was added over a period of 66 minutes, and the reaction allowed to proceed for an additional 60 minutes with stirring at ice bath temperature. The reaction mixture was diluted with ice and neutralized with aqueous potassium hydroxide solution, after which the aqueous layer was drawn off and discarded. The crude reaction mixture was next washed with distilled water, dried by shaking with sodium bicarbonate and filtered to obtain 2700 grams (97%) of product dissolved in excess benzene. Distillation of this mixture to obtain the monophenyl alkane gave the following yields:

| Fraction | Volume, Percent | Weight, gms. | Boiling Range, °F. at 760 mm. |
|---|---|---|---|
| Benzene Fraction | 57.5 | 1,557 | 175–455 |
| Monophenyl dodecanes | 38.6 | 1,000 | 455–625 (92% from 510–550) |
| Bottoms | 3.9 | 143 | 625+ |

The monophenyl dodecane fraction was 80.5% of the total alkylate after removal of excess benzene; 11.5% of the alkylate was lost to overhead benzene cut and about 8.0% was lost to distillation bottoms. Conversion of olefin to alkylate was essentially 100%.

Inspections on the monophenyl dodecane fraction were:

| | |
|---|---|
| Gravity (A. P. I.) | 31.4 |
| Specific dispersion | 131 |
| Refractive index $n_D^{20}$ | 1.4874 |

The propylene tetramer fraction utilized in the preparation of the foregoing compound was characterized by the following inspections:

| | |
|---|---|
| Boiling range at 760 mm °F | 340–420 |
| Gravity (A. P. I.) | 51.6 |
| Refractive index $n_D^{20}$ | 1.4370 |
| Viscosity at 100° F centistokes | 1.228 |
| Viscosity at 210° F do | .644 |
| Bromine number | 92 |

Example 12

The monophenyl pentadecane fraction was prepared by condensing the propylene pentamer of Example 2 with benzene in the presence of anhydrous hydrofluoric acid as a catalyst by a procedure substantially as described in Examples 10 and 11 above. The data on two such preparations may be summarized as follows:

| | Run A | Run B |
|---|---|---|
| Pentadecene Inspections: | | |
| Boiling range (760 mm.) | 420–510° F | 420–520° F. |
| Gravity, ° A. P. I. | 45.3 | 44.7. |
| Bromine Number | 95 | 102. |
| Reaction Conditions: | | |
| Mol. Ratio (pentadecene: benzene: HF) | 1:5.3:2.5 | 1:5:4. |
| Temperature | Ice Bath | Ice Bath. |
| Pressure | Atmospheric | Atmospheric. |
| Vessel | Stainless Steel | Stainless Steel. |
| Addition time | 51 minutes | 60 minutes. |
| Reaction time | 45 minutes | 3.75 hours. |
| Yield Data: | | |
| Reactants used— | | |
| Pentadecene | 627 gm | 738 gm. |
| Benzene | 1246 gm | 1640 gm. |
| Crude yield after wash | 1777 gm | 2270 gm. |
| Crude yield, percent | 95 | 95.5. |
| Distillation: | | |
| Charge | 1742 gm | 2270 gm. |

| | Vol. Percent | Wt., gms. | Vol. Percent | Wt., gms. |
|---|---|---|---|---|
| Cuts— | | | | |
| No. 1 (benzene) | 75 | 1,302 | 69 | 1,567 |
| No. 3 (monophenyl pentadecanes) | 18 | 320 | 25 | 568 |
| No. 4 (bottoms) | 7 | 120 | 6 | 135 |

| | | |
|---|---|---|
| Boiling Ranges at 760 mm.: No. 3 (monophenyl pentadecanes) | 515–664° F (63% from 580–630) | 520–680° F. (82% from 580–630) |
| Percent Theoretical Yield | 37.2 | 55.6. |
| Percent of Pentadecene to Bottoms | 16.1 | 14.3. |
| Inspections on Monophenyl Pentadecanes: | | |
| Gravity, ° A. P. I. | 31.9 | 30.6. |
| Specific dispersion | 129 | 128. |
| Refractive Index $n_D^{20}$ | 1.4850 | 1.4886. |

The foregoing mixtures of monophenyl alkanes are believed to be novel compositions of matter and possess a unique combination of properties. These new and unpredictable characteristics are illustrated by comparison with alkyl benzenes derived by alkylation of benzene with mixed butene polymers in the $C_{12}$ to $C_{16}$ range. In comparative tests alkylation of benzene with $C_{12}$ olefins from mixed butenes (boiling range 350° F. to 400° F. A. P. I gravity 45.2) yielded only 29% of alkylate having a molecular weight corresponding to that of the alkenes. Approximately 48% of the olefin was lost to light alkylate by reason of degradation or fragmentation, and about 23% was lost to distillation bottoms. Conversion of olefin to alkylate was about 86.3%. In contrast thereto, alkylation of benzene with a $C_{12}$ polypropylene (boiling range, 340° F. to 420° F., A. P. I. gravity, 41.6) gave an 80.5% yield of the corresponding monophenyl dodecanes with approximately 100% conversion. Subsequent sulfonation of the foregoing alkyl benzene from mixed butenes revealed 25.6% of unsulfonatable residue requiring purification for removal, and only 74.4% of the alkyl benzene was convertible to the sulfonate. On the other hand, 97.2% of the monophenyl dodecane fraction from polypropylene was converted to the desired sulfonate and required no purification. Significant distinctions in the structure of the mixed butene alkylate and the monophenyl dodecanes from polypropylene are shown by the fact that in a detergency test at 0.2% concentration (60% sodium sulfate—40% sodium sulfonate) under comparable conditions, the polybutene benzene sulfonate gave a value of 1 as compared with a value of 46 for the sulfonated monophenyl dodecane fraction from polypropylene.

Continuing now with the flow sheet and conversion of the monophenyl alkanes, first, to a phenyl sulfonic acid-substituted alkane, and then to the sodium salt thereof, reference to Fig. 4 will reveal that the complex mixture of monophenyl alkanes from fractionator 33 flows through line 34 to the sulfonate process stage.

Ordinarily, the phenyl alkanes of this invention may be sulfonated directly without further treatment, but provision is made in Fig. 4 for color stabilization and correction of off-color products by a preliminary extraction with a selective solvent for color bodies and their precursors. As here shown, the phenyl alkane may be sent to treater 36 through valve-controlled line 180 and contacted with a selective solvent for color bodies, preferably sulfuric acid. This preliminary treatment desirably is of controlled severity (well understood in the art) sufficient to reach and selectively extract color bodies and unstable compounds, likely to form color bodies, but insufficient to sulfonate the phenyl alkanes in significant amounts. Suitable acid concentrations and treating temperatures are from 95 to 98% sulfuric acid at 60 to 80° F. The phenyl alkanes are thoroughly contacted with the acid treating agent and the mixture allowed to separate into an upper alkane layer and a lower acid layer containing the selectively extracted color compounds. The extracted phenyl alkanes next pass by way of valve-controlled overflow line 181 to the sulfonation stage.

In the usual case, the phenyl alkanes of this invention may flow directly to the sulfonation stage through valve-controlled by-pass line 183. As here shown, the fresh alkane feed passes by way of inlet line 182 together with reaction mixture into sulfonator 37. The sulfonation reaction is extremely rapid and is well over 95% complete at the time of mixing the fresh alkane with the reaction mixture. However, longer contact times are utilized and intimate dispersion effected to obtain substantially 100% sulfonation and insure against the presence of unsulfonated residues which tend to cause undesirable color or odor. A contact time of up to about two hours assures these results and is obtained in the embodiment of Fig. 4 by the circulation of the reaction mixture from the bottom of the sulfonator through outlet conduit 185 to pump 186. Fresh acid is introduced by way of inlet line 184. This acid, together with previously formed reaction mixture, flows to the inlet side of said pump which serves not only to force circulation of the mixture, but also to intimately contact the acid and hydrocarbon components and facilitate complete sulfonation. The reaction mixture being circulated next passes to cooler 187 where heat of reaction is removed and the temperature of sulfonation controlled by circulating any suitable heat exchange fluid through the cooler as indicated. Fresh phenyl alkane then flows into the reaction mixture at the outlet of the cooler and continues in the circulation cycle through feed inlet 182 to sulfonator 37.

Reaction temperature in the sulfonation zone is important and should be maintained sufficiently high to effect complete sulfonation, but not so high as to cause color deterioration or undesirable side reactions. Exemplary operating conditions are illustrated by sulfonation with 20% fuming sulfuric acid in an amount of about 200 pounds of acid for each 175 pounds of phenyl alkane while maintaining the reaction temperature below a maximum of about 130° F. and generally above about 90° F. with a residence time in the sulfonator under these conditions of about two hours.

The sulfonated phenyl alkane together with entrained acid is passed from sulfonator 37 by way of outlet line 38 either directly to the neutralization stage as indicated by valve-controlled by-pass 188 or to settler 39 by valve-controlled circuit 189. Water may be introduced into the reaction mixture through line 191 when desired and facilitates separation of the acid and the sulfonated oily layer into separate phases in settler 39. Upon separation of the reaction mixture into separate phases, the lower sulfuric acid layer may be removed through outlet conduit 192 and recycled through valve-controlled line 190 to pump 186 when desired. In a typical operation, such as previously described, 15 to 35 pounds of acids will be withdrawn as a lower layer in settler 39 for each 200 pounds of acid originally introduced in sulfonator 37. The remaining sulfonated layer, when neutralized, will yield a composition containing about 60% of the salt of sulfonated phenyl alkanes and about 40% sodium sulfate. The separation of acid layer is found further to improve color and odor of inferior products. However, because of the high quality of the phenyl alkanes produced in accordance with this invention, such a separation is usually unnecessary unless the sulfate content of the sulfonate is to be reduced, and it is generally preferred to pass the sulfonated phenyl alkane together with its entrained acid directly to neutralizer 41.

In those instances where settler 39 is utilized to further improve color or to yield product of lower sulfate content, the sulfonated phenyl alkane flows by way of valve-controlled outlet 193 to neutralizer 41.

Sulfonator 37 under the reaction conditions herein described yields a mixture of sulfonic acids in which the sulfonic acid group is directly attached to the benzene ring and this ring is in turn attached to an alkane of polypropylene structure corresponding in molecular weight to polypropylenes boiling within the ranges herein previously described. These sulfonic acids, even after preliminary removal of entrained acid by gravity separation, contain some free sulfuric acid. Thus, the sulfonation mixture flowing to neutralizer 41 by way of inlet line 194 is a mixture of sulfuric acid and sulfonic acids.

In the neutralization it is preferred to introduce the sulfonic acid mixture slowly into a vigorously stirred body of aqueous caustic soda solution previously fed to the neutralizer through line 196 in order that a more fluid solution will form. Also, an excess of alkali desirably should be present throughout the neutralization and until an end point of from about pH 7.0 to pH 8.5 is reached. This procedure gives a superior product and prevents local overheating and color deterioration occasioned by the reverse procedure of addition of caustic to the sulfonic acid reaction mixture. If desired, alcohol also may be added to neutralizer 41 further to increase fluidity of the reaction mixture and thereby promote effective contact between the reacting ingredients as well as better temperature control.

Temperature of reaction in the neutralizer is exceedingly important since it has been found that excessively high temperatures of neutralization instigate color deterioration. This is particularly true if the free sulfonic acids rather than sodium salts thereof are subjected to high temperatures, and it is for this reason that an excess of caustic is maintained up to the end point of the reaction while simultaneously maintaining temperature during neutralization below a maximum of about 130° F. and preferably no higher than about 120° F. In order to effect this temperature control, the reaction mixture is continously circulated by way of outlet conduit 197, pump 198 and cooler 199 back to neutralizer 41. Heat of neutralization is removed in cooler 199 by circulation of any suitable heat exchange fluid therethrough as indicated in the drawing.

Builders or other additives for improving detergency or wetting action may be incorporated in the sulfonate salts of this invention as by introduction into the neutralizer through line 201. Exemplary builders are trisodium phosphate, tetrasodium pyrophosphate, sodium silicate, and the like. Soluble magnesium salts in small amounts (for example 1–5%) also may be added. Alkali metal salts of high molecular weight carboxylic acids, such as the sodium salt of carboxymethyl cellulose, have been found to enhance detergency, particularly on cotton fabrics.

The sulfonate compositions of this invention may be produced in the form of a concentrated aqueous slurry which may be sold as such but which is particularly adapted to yield a strong, hollow, globular, spray-dried product. The production of such a concentrated slurry, sufficiently fluid to be pumpable at suitable handling temperatures, for example, 70–130° F. and yet which does not stratify unduly during handling or yield inferior spray-dried globules which collapse easily to form fines, requires a critical correlation of proportions of ingredients. A suitable slurry should have a water content of at least 50% but no more than about 65%, and preferably from 55–60% by weight based on the total slurry. The solids content of such a slurry should contain no more than from about 30 to 50% by weight of the sulfonate, the remainder being inorganic salt exemplified by sodium sulfate with or without small amounts of tetrasodium pyrophosphate or similar builders.

In an exemplary production of a desirable slurry, the specific sulfonation reaction mixture described in connection with the sulfonation stage is utilized, and 15–35 pounds of sulfuric acid is withdrawn. The remaining sulfonate layer is then neutralized with about 300 pounds of 41% caustic soda water solution and finished to a pH of about 7.5. The resulting mixture will contain from about 55–65% water, and the solids will consist of about 60% neutralized sulfonic acid and about 40% sodium sulfate. It usually will be found desirable to build up the sodium sulfate content of this slurry to from 50 to 70% by weight of the sodium sulfonate content thereof to avoid gelling. This may be done by introducing additional sodium sulfate through valve-controlled line 202, and the sulfate so introduced may be obtained by means of neutralization of sulfuric acid from settler 39 with alkali such as sodium carbonate or sodium hydroxide as shown at 205. The finished slurry is readily handled as a pumpable mixture and may be spray-dried to form hollow globular particles of 20 to 40 mesh which are sufficiently strong to resist collapse or objectionable formation of fines during packaging and distribution.

In those instances where it may be desired for special reasons to produce a relatively pure sulfonate, the aqueous slurry withdrawn from neutralizer 41 may flow from outlet conduit 197 by way of valve-controlled line 203 to an alcohol extractor 204 where addition of alcohol to the aqueous mixture serves to precipitate out the sodium sulfate or other inorganic salts and extract the sulfonate to yield a solution of the sulfonate in aqueous alcohol. This solution may then be passed by way of conduit 206 to a suitable recovery unit such as a drier 42. It is preferred, however, in most instances to utilize the sulfonate-sulfate mixture as previously described.

Depending upon the final use of the product and the most desirable physical form therefor, the aqueous slurry may be stored as such or converted to a dried product in any suitable drier 42. It has been found that a flake product, such as is formed on a drum drier, and a spray-dried product are preferred physical forms. An exemplary spray-dried product may be prepared in accordance with Lamont, U. S. Patent No. 1,652,900 issued December 13, 1927, to yield a preferred hollow, globular type substantially non-dusting form found especially desirable for small package marketing in the household detergent field.

The sulfonate detergents herein disclosed possess surface-active properties to an exceptional degree and give marked effects in water at extremely low concentrations. As little as one molecule in 40,000 imparts marked foaming properties and good detergency even on grimy fabrics. One molecule of the detergent of this invention in a hundred thousand molecules of water is capable of decreasing the surface tension from 73 dynes per centimeter to 29 dynes per centimeter. Typical tests on such a finished detergent and wetting agent are:

Alcohol soluble _____ 40%
Non-saponifiable extract _____ 0.4%
Solution color (1% in water) _____ 15 Saybolt
pH (1% in water) _____ 7.0–8.0
Bulk density (dried form)__ 0.2 to 0.4 gm./mol Unless otherwise indicated, the following test data are on a detergent product containing about 60% sodium sulfate and having the foregoing properties.

To illustrate more specifically the detergency properties of the compounds and compositions herein disclosed, tests were run on heavily soiled worsted at 110° F. in the Launder-O-Meter (test described in the Official Test Methods of American Association of Textile Chemists and Colorists, published 1940).

The water had a hardness of 200 parts per million as calcium carbonate plus 100 parts per million as carbonate of magnesium. Four twenty-minute washes and two ten-minute rinses were given. The results expressed as per cent soil removal are given below:

| Concentration | Soil Removal |
|---|---|
| Percent | Percent |
| 0.10 | 4 |
| 0.15 | 8 |
| 0.20 | 62 |
| 0.30 | 94 |
| 0.40 | 91 |

Similar tests on cotton have shown that the detergent of this invention is excellent for this fabric also and that it responds well to various types of builders. For example, in a test such as that above, but using a heavily-soiled finely-woven (and hence difficult to clean) cotton at a temperature of 140° F., a high grade commercial soap at 0.2% concentration has a detergency rating of 100, whereas the detergent herein disclosed at the same concentration has a detergency rating of 265. It is indicated also that in tests in hard water on cotton cloth soiled according to the method given in U. S. Navy Specification 51-S-47 (Int) Bureau of Ships, October 1, 1945, this detergent has extraordinary synergistic action in conjunction with alkaline builders, such as trisodium phosphate.

Apparatus and procedure as described by Ross and Miles (Oil and Soap, May 1941, pages 99-102) were used to check the height to which foam rose in a jacketed tube when 200 cc. fell in a fine stream down through a distance of 90 centimeters. The test was run in 300 p. p. m. hard water and 50 p. p. m. hard water with solutions and apparatus maintained at 110° F.

| Weight Percent Concentration | Foam Height (mm.) |
|---|---|
| In 300 p. p. m. Water: | |
| 0.10 | 131 |
| 0.20 | 205 |
| In 50 p. p. m. Water: | |
| 0.05 | 116 |
| 0.10 | 190 |
| 0.20 | 222 |

Similar tests run by the method of Ross and Miles at 110° F. with total solids held at a concentration of 0.2% while various ratios of the detergent of this invention and alkalies, such as trisodium phosphate, were employed gave foam heights as stated.

*Foam height by Ross-Miles Test sulfonate detergent and trisodium phosphate 300 p. p. m. hardness water*

[Total solids=0.2%]

| Sulfonate Detergent | Trisodium Phosphate | Foam Height |
|---|---|---|
| Percent | Percent | Mm. |
| 100 | 0 | 185 |
| 80 | 20 | 215 |
| 60 | 40 | 222 |
| 50 | 50 | 225 |
| 40 | 60 | 212 |
| 20 | 80 | 200 |
| 10 | 90 | 183 |
| 0 | 100 | 0 |

One inch squares of 10 oz. cotton duck were observed for the time in seconds required for them to wet and sink in the detergent solutions of varying concentrations in distilled water, 1% sodium hydroxide and 5% sulfuric acid.

*Wetting time*

[10 oz. Cotton Duck]

| Concentration, percent | | Distilled Water | 5% Sulfuric Acid | 1% Sodium Hydroxide |
|---|---|---|---|---|
| 1.0 | sec | 7.6 | 12.6 | 10.2 |
| 0.5 | sec | 13.7 | 15.8 | 12.3 |
| 0.25 | sec | 28.2 | 26.6 | 35.1 |
| 0.00 | days | 2 | | |

Graphical interpolations in the above data give the concentrations of the detergent of this invention necessary for 25 second wetting time as 0.28% in distilled water, 0.27% in 1% sodium hydroxide, and 0.31% in 5% sulfuric acid.

Cotton wetting tests run by the Draves method for wetting and sinking a standard skein of yarn were run at 25° C. in distilled water, 1% sulfuric acid and 1% sodium hydroxide. A three-gram hook was used.

| Concentration Detergent, Percent | | Draves Sinking Time | | |
|---|---|---|---|---|
| | | Distilled Water | 1% Sulfuric Acid | 1% Sodium Hydroxide |
| 0.00 | hrs | Over 24 | | |
| 0.05 | sec | 250 | 300 | 167 |
| 0.10 | sec | 25 | 40.5 | 29.9 |
| 0.25 | sec | 5.9 | 6.5 | 8.3 |
| 0.50 | sec | 3.2 | 2.9 | 5.7 |
| 0.75 | sec | 2.8 | 2.5 | 4.5 |
| 1.00 | sec | 2.4 | 2.2 | |

The solubility of the detergent has been determined in distilled water, 1% sulfuric acid, and 1% sodium hydroxide by measuring the minimum temperature which gives a clear solution for a given concentration. From these data the solubility at any desired temperature can be determined graphically.

| Concentration Detergent, Percent | Minimum Temp. (°F.) for Clear Solution | | |
|---|---|---|---|
| | Distilled Water | 1% Sulfuric Acid | 1% Sodium Hydroxide |
| 0.1 | | | 68 |
| 0.5 | | | 114 |
| 1.0 | 52 | 31 | 121 |
| 2.0 | 62 | 61 | 140 |
| 3.0 | 85 | | |
| 5.0 | 117 | 142 | 177 |
| 7.5 | | 172 | 210 |
| 9.0 | | 187 | |
| 10.0 | 160 | | |

At 68° F. the clear solubility of detergent in either distilled water or 1% sulfuric acid is indicated as approximately 2.3%.

Clear solubility in hard water was determined by titrating the sulfonate detergent solutions with concentrated hard water to a point where the turbidity just obscured the markings on a 50 cc. graduated cylinder as observed through the solution.

| Concentration Detergent, Percent | Maximum Water Hardness for Clear Solution at 68° F. in p. p. m. Calcium Carbonate |
|---|---|
| 0.69 | 775 |
| 0.61 | 715 |
| 0.47 | 600 |
| 0.38 | 557 |
| 0.19 | 440 |
| 0.09 | 384 |

More concentrated solutions of the sulfonate detergent are capable of giving clear solutions in even harder water.

Though the sulfonate detergent by itself is soluble to the extent of approximately 2% at room temperature, it can be solubilized by use of a lower molecular weight sulfonate to give solutions running as high as 24% of detergent and 31% of total solids at room temperature. A suitable solubilizing sulfonate is any of the highly water soluble types such as those recovered in the acid treatment of light petroleum fractions or an isopropyl to hexyl benzene sulfonate. Dilution of these concentrates gives solutions usable at slightly lower temperatures.

At room temperature (25° C.) 10% isopropyl alcohol will dissolve the sulfonate detergent to give 20% by weight in the solution. Isopropyl alcohol in strengths from 7% up to 20% readily dissolves 15% of the sulfonate detergent at room temperature. However, at 40° C., 7.5% to 12.5% isopropyl alcohol can dissolve 20% of the sulfonate of this invention.

Surface tension measurements at 25° C. run on Du Nuoy Tensiometer are given as well as interfacial tensions relative to a U. S. P. White Oil of 29.5 dynes per centimeter surface tension. Results are given for solutions in 300 P. P. M. hard water as well as distilled water.

| Concentration Detergent, Percent | Distilled Water | |
|---|---|---|
| | Surface Tension (Dynes/cm.) | Interfacial Tension |
| 1.0 | 27 | 1.4 |
| 0.5 | 29 | 2.1 |
| 0.25 | 29 | 2.7 |
| 0.10 | 29 | 3.6 |
| 0.10 | 40 | 20.7 |
| 0.005 | 43 | 28.7 |
| 0.001 | 56 | 39.9 |

| Concentration Detergent, Percent | Surface Tension (Dynes/cm.) | Interfacial Tension |
|---|---|---|
| 1.0 | 26 | 0.7 |
| 0.5 | 26 | 0.7 |
| 0.25 | 27 | 0.9 |
| 0.10 | 27 | 1.5 |
| 0.01 | 29 | 5.8 |
| 0.005 | 30–34 | 10.7 |
| 0.001 | 43–50 | 29.2 |

An illustration of the stability of this detergent is given by the following test. Two per cent of the sulfonate detergent dispersed in 10% sodium hydroxide was refluxed for 24 hours at a temperature of approximately 215° F. An air jet on the surface was used to keep down foaming. Samples taken from the beginning and end of the run were diluted with nine parts of water and tested for foam height and wetting time.

| Test Used | Initial | Final |
|---|---|---|
| Foam (Ross-Miles) mm | 228 | 230 |
| Wetting Time (10 oz. duck) sec | 19 | 24 |

A similar test was run on a solution of 1% of detergent in 15% sulfuric acid, which was then refluxed for 24 hours. Samples from the beginning and end of the test were diluted nine to one with water and checked for wetting time.

| Test Used | Initial | Final |
|---|---|---|
| Wetting Time (10 oz. duck) | Sec. 29.1 | Sec. 35.1 |

The surface active properties of this detergent are not destroyed by boiling with 10% caustic or 15% sulfuric acid.

A solution of 0.2% of the detergent of this invention in 0.25% sodium hypochlorite was allowed to stand 80 hours. A check on the wetting times of the solution at start and finish gave 18.2 sec. initially and 17.3 sec. finally on 10 oz. cotton duck.

Further than this a 0.2% suspension of the detergent in 5.2% sodium hypochlorite solution was analyzed at the beginning and end of a four day observation. The available chlorine determined iodimetrically was unchanged at the end of the test.

It appears there is negligible effect of dilute hypochlorite on the detergent or of detergent upon the hypochlorite.

The toleration of this detergent for various metal salts is expressed below. Ten ml. volumes of a 1% solution of detergent were placed in 25 ml. flasks. One per cent solutions of the metallic salts were added to separate samples near the boil point in dropwise fashion from a burette until it was no longer possible to see through the solution. The results are expressed as number of milligrams of metallic salt added to cause turbidity.

| Metallic Salt | Mgs. to Cause Turbidity |
|---|---|
| Aluminum Sulfate | 2 |
| Barium Chloride | 2 |
| Calcium Chloride | 18 |
| Copper Sulfate | 67 |
| Ferric Sulfate | 4 |
| Lead Nitrate | 3 |
| Magnesium Sulfate | 46 |
| Mercuric Chloride | 100 |
| Nickel Nitrate | 35 |
| Zinc Nitrate | 43 |

The sulfonate compositions herein disclosed have a variety of applications in industry exemplified by the following:

Quicker "break" and easier rinsing on all goods merit applications in commercial laundries for the washing of woolens and fine fabrics as well as for grease and soil removal from high oil content washes such as overalls and oil wiping cloths.

In the metal cleaning industry the sulfonates of this invention may be utilized for degreasing, corrosion inhibiting or the like in acid pickling and clean rinsing solution.

High sanitation in household dishwashing and of equipment and buildings in dairy cleaning and food processing is obtainable with these detergents which are particularly adapted for washing of fruits and vegetables prior to packing or quick freezing.

Use in liquid paint cleaners for better grime removal without effect on paint luster, and utilization for automobile washing to give sparkling finish on weathered surfaces, further illustrate the attributes of the present sulfonated phenyl-substituted alkanes. Likewise, these compounds may be utilized for wool scouring, for penetration and evenness in dyeing and filling textiles, in pigment processing—to make water colors and fillers for paper, cement, and water paints—as well as to improve wetting and spreading of insecticides or herbicides and to increase penetration thereof. These sulfonates also find application in blends with sodium bisulfate or with alkaline builders in industrial cleaning compounds. Again the surface activity of the sulfonated compounds of this invention adapts them for use in ore processing as a collector and frothing agent and in pulp and paper processing for defibration, bleaching and rinsing.

To further illustrate the foregoing and other uses of the products herein disclosed, the following examples are given. In these examples, the mixed sulfonated phenyl-substituted polypropylene alkanes are utilized in the form of the sodium salts and contain about 40% by weight of sodium sulfate unless otherwise indicated. For convenience this mixed product is hereinafter identified as sulfonate detergent or as polypropylene-benzene sulfonate detergent. It will be understood that these examples are merely illustrative.

Example 13

Cleansing composition

About three parts by weight of sulfonate detergent is dissolved in 500 parts of water. The solution is a cleanser for painted surfaces.

Example 14

Laundering composition

To 70 gallons of water add one pound of polypropylene benzene sulfonate, one pound of sodium chloride and one-fourth pound of soda ash. This solution when employed in a washing machine forms a cleansing agent characterized by its marked ability to remove dirt and stains as well as its ability to function either in hard or soft water.

Example 15

Cleansing composition for fibrous material

Sulfonated phenyl polypropylene alkanes containing 2% by weight of lauryl alcohol when dissolved in water to form a .6% aqueous solution suitable for cleansing fibrous material such as wool, cotton or the like.

Example 16

Scouring composition

Twenty parts by weight of sulfonate detergent (substantially salt-free) and 60 parts by weight of common salt may be used in aqueous solution to scour any fibrous substance such as cotton, artificial silk, paper pulp etc. In these mixtures the common salt can be replaced by other salts such as ammonium chloride, sodium acid sulfate or sodium carbonate. Water soluble alcohols likewise may be added.

Example 17

Cleansing composition for raw wool

An aqueous solution containing 0.5% soda ash and 0.2% sulfonated phenyl polypropylene alkane is prepared. Raw wool which has been previously treated 15 minutes in an aqueous 0.8% soda ash solution at 120° F. is next treated in the sulfonate bath for 15 minutes at about 115° F. and subsequently rinsed. The wool is well cleaned and substantially free from natural waxes and fats.

Example 18

Cleansing composition

Ten parts of normal cetyl sodium sulfate, twenty parts of diisopropylene naphthalene sodium sulfonate and seventy parts of sulfonated phenyl polypropylene alkane are mixed. Two parts of this mixture may be dissolved in 500 parts of water to produce a cleansing solution for cotton, silk, wool or rayon.

Example 19

Polish

Five parts of carnauba wax are melted by heating to about 90° C. and the melted wax added with vigorous stirring to an aqueous solution containing a small amout of sulfonate detergent (for example, .5%). A smooth emulsion is produced which has marked polishing and cleansing action when applied in the usual manner to furniture, leather, automobiles and other highly polished enamel, lacquered or painted surfaces.

Example 20

Soap composition

One to two parts of sulfonate detergent may be added to one part of ordinary soap to inhibit precipitation from hard water and prevent the formation of curds or tacky deposits.

Example 21

Cleansing composition

Ninety-five parts of sulfonated phenyl polypropylene alkane from which inorganic salts have been removed by treatment with alcohol to yield the substantially salt-free product are mixed with five parts of sodium palmitate. A solution in water equivalent to one part of this mixture in 500 parts water is a cleansing solution for wool and other fabrics. The solution may be in soft or hard water and may be acid, neutral, or alkaline. Other soaps may be substituted for the sodium palmitate such as ordinary fatty acid soaps sold commercially as "Ivory," "Lux," "Castile" and the like.

Example 22

Cleansing composition

An excellent detergent may be obtained by mixing from 20 to 80 parts by weight of sulfonate detergent with 80–20 parts by weight of an alkyl sulfonate detergent such as is obtained by the chlorosulfonation of long-chained aliphatic hydrocarbons or mixtures thereof such as a paraffinic petroleum fraction having an average molecular weight of 175 to 500. A suitable material may be prepared by the process of Reed, Reissue Patent No. 20,968, issued January 3, 1939.

Example 23

Emulsion

An aqueous solution is prepared containing

10% isopropyl alcohol and 20% sulfonate detergent from which inorganic salts have been extracted by alcohol treatment. Sixty parts of mineral oil (white oil grade) are added slowly with thorough mixing to sixty parts of the foregoing solution. The resulting emulsion disperses readily in water to give a mixture suitable for textile oiling and for parasiticidal purposes.

EXAMPLE 24

*Wetting composition*

Five parts of paratertiary amyl phenol and ninety-five parts of sulfonate detergent are mixed. One part of this mixture in one hundred parts of water greatly enhances the wetting action thereof.

EXAMPLE 25

*Cleansing and bleaching of cotton cloth*

0.4 to 1% of sulfonate detergent is added to a sodium hypochlorite solution containing 0.7% available chlorine. Heavily woven unbleached cotton cloth or unbleached cotton yarn may be immersed in this solution at room temperature for about 5 minutes, squeezed, exposed to the air until bleached and then rinsed and treated with antichlor in known manner.

EXAMPLE 26

*Sizing composition*

Three hundred parts of magnesium sulfate and two parts of sulfonated phenyl polypropylene alkane are dissolved in one thousand parts of water. The resulting solution is utilized in the sizing of fibrous materials such as cotton in the well-known manner.

EXAMPLE 27

*Pigment dispersion*

One-half part of lampblack is added to a solution of one part of sulfonate detergent in five hundred parts of water. The lampblack is rapidly dispersed throughout the solution with agitation.

The sulfonated phenyl alkane detergents of this invention may be used in combination or admixture with other wetting agents and detergents of either the anionic or non-ionic type. In general, from about four parts of sulfonated phenyl polypropylene detergent to one part of the additive wetting agent or detergent on the one hand, to from about one part of said sulfonated phenyl polypropylene detergent to four parts of the additive, may be utilized. Further, such admixtures may contain inorganic salts, such as sodium sulfate, trisodium phosphate, sodium silicate, tetrasodium pyrophosphate, and the like. In the case of anionic additives the mixture usually will contain sodium sulfate or the like in an amount of from about 40–80% by weight based on the entire detergent composition. Additive wetting agents and detergents of the above-mentioned anionic type, which may be utilized in combination with sulfonated phenyl polypropylene detergents as disclosed, are exemplified by primary alkyl sulfates, secondary alkyl sulfates, sulfated glycerol esters, aliphatic sulfonates, sulfonated esters or amides of fatty acids (Igepons), sulfonated or sulfated polyglycol ethers of alkyl phenols, mixtures of sulfonate-substituted compounds obtained by addition of nitrosyl chloride to an olefin followed by reaction with sodium sulfite, alkyl sulfoacetates, salts of alkenyl succinic acids and salts of monoalkyl esters of alkenyl succinic acids. Non-ionic types of wetting agents and detergents likewise utilizable in combination with sulfonated phenyl polypropylene detergents as previously disclosed are illustrated by polyglycol ethers of alkyl phenols, polyglycol esters of fatty acids, alkyl polyglycol ethers, polyglycol derivatives of alkyl amines, condensation products of 1,3 dioxolane (glycol formal) and fatty acids, glycerol and glycol esters of fatty acids, alkyl polyalkylene polyamines. In general it should be noted that anionic wetting agents and detergents are characterized by a polar group, such as:

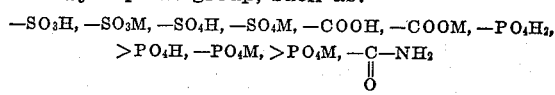

Non-ionic detergents are characterized by ether, ester, amino and analogous polar groups.

The following detailed disclosure illustrates various preferred types of additive wetting agents and detergents which may be utilized in combination with sulfonated phenyl polypropylene detergents of this invention in proportions of from about 80 to about 20% of polypropylene type detergent to from about 20 to about 80% of the additive.

I. *Aliphatic sulfates*

(1) Primary and secondary alkyl sulfates

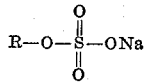

Examples: Lauryl sodium sulfate, cetyl sodium sulfate, polypropylene sodium sulfate, "Keryl" sodium sulfate.

(2) Sulfated esters (a) Sulfated diglycerides

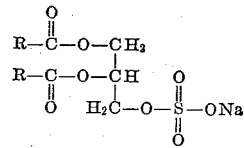

Examples: Sulfated mono- and diglycerides from cocoanut oil, palm oil, lard oil, and the like.

(b) Sulfated mono-glycerides

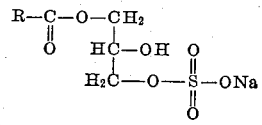

Examples: Sulfated mono- and diglycerides from cocoanut oil, palm oil, lard oil, and the like.

(3) Sulfated ethers (a) Sulfated glyceryl di-ethers

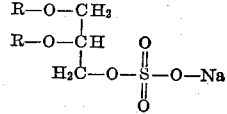

(b) Sulfated glyceryl mono-ethers

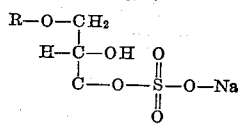

Examples: Octyl, lauryl, cetyl, mono- and di-ethers of glycerine.

II. *Sulfonates*

(1) Alkyl sulfonates

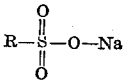

Examples: R may be octyl, decyl, cetyl, paraffin wax, polypropylene, "Keryl" or other mineral oil aliphatic type radicals.

(2) Alkyl hydroxy aromatic sulfonates

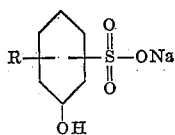

Examples: R may be octyl, decyl, cetyl, paraffin wax, polypropylene, "Keryl" or other mineral oil aliphatic type radicals.

III. Non-ionic type (1) Polyglycol ethers of alkyl phenols

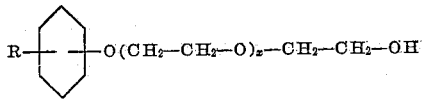

Examples: R is lauryl, cetyl, "Keryl," polypropylene, paraffin wax etc. and $x$ is 2 to 20.

(2) Polyglycol esters of aliphatic acids

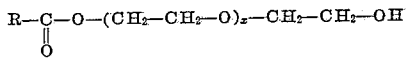

Examples:

may be lauric, stearic, oleic, palmitic, or naphthenic acid radicals and $x$ is 2 to 20.

(3) Alkyl polyglycol ethers

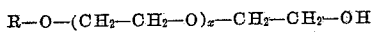

Examples: R is glyceryl, lauryl, cetyl, "Keryl," polypropylene, paraffin wax etc. and $x$ is 2 to 20.

(4) Polyglycol derivatives of alkyl amines (a) Mono-alkyl amine

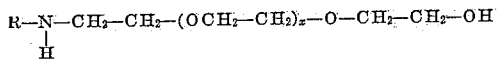

Examples: R may be octyl, lauryl, cetyl, "Keryl," polypropylene, paraffin wax etc. and $x$ is 2 to 20.

(b) Dialkyl amine derivatives

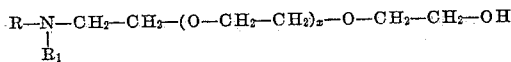

Examples: R and $R_1$ may be octyl, lauryl, cetyl, "Keryl," polypropylene, paraffin wax etc. and $x$ is 2 to 20.

(5) Alkyl polyalkylene polyamines:

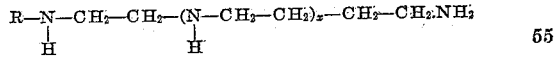

Examples: R may be octyl, lauryl, cetyl, "Keryl," polypropylene, paraffin wax etc. and $x$ is 2 to 20.

The foregoing disclosures relate to the utility of alkali metal salts of the phenyl sulfonic acid substituted polypropylene alkanes. It is to be understood that other salts of these sulfonic acids have surface activity and other useful properties. For example, the ammonium, calcium and magnesium salts thereof possess wetting and detergent properties. Additionally, the free (unneutralized) sulfonic acids of phenyl substituted polypropylene alkanes may be freed of entrained sulfuric acid by any suitable method, such as alcoholic extraction, to yield sulfonic acid compositions having useful surface-active and cleansing properties.

It should be noted that the previously disclosed mixture containing 20% aliphatic sulfates with 80% of sulfonates of this invention possesses surprising and unpredictable properties. It has been found that these certain mixtures of an alkyl sulfate detergent such as lauryl sulfate with alkyl benzene sulfonate detergents, such as previously disclosed herein, possess greater resistance to caking on storage in a humid atmosphere than does either detergent alone. Substantially optimum anti-caking effects are obtained with lauryl sulfate detergent at the above mentioned 20% concentration level. The equivalent proportions in this 20% range are relatively critical as will be shown by subsequent data. Likewise, although lauryl sulfate detergent is the preferred additive for inhibiting caking, other alkyl sulfates within the 8 to 12 carbon atom range may be utilized to impart substantial beneficial properties to the detergent composition. The anti-caking effect of alkyl sulfates in this range and in the designated proportion is applicable to a wide variety of alkyl aryl sulfonate detergents, preferably those of the alkyl substituted mono-nuclear aryl type averaging from about 12 to 15 carbon atoms in the alkyl group.

Anti-caking data hereafter given were obtained on alkyl benzene sulfonate-alkyl sulfate detergent mixtures in which the alkyl sulfate detergent contained 40% lauryl sulfate as the active ingredient and 60% sodium sulfate. The alkyl benzene sulfonate of this detergent mixture likewise contained 40% active ingredient (polypropylene benzene sulfonate herein disclosed) and 60% sodium sulfate.

It is apparent that various builders may be used in lieu of part of the sodium sulfate as is well known in the art. Exemplary builders which may be incorporated in these detergent mixtures are the water soluble polyphosphates such as sodium tetrapolyphosphate or sodium tripolyphosphate. Other exemplary known builders are tetrasodium pyrophosphate, sodium silicate, and sodium carbonate.

The outstanding anti-caking action of lauryl sulfate and the critical ratios of lauryl sulfate to alkyl benzene sulfonate in the detergent composition is illustrated by the following data:

*Table VI*

| Percent Active Ingredient [1] | | Percent Entire Detergent Uncaked [2] (Thru #4 Sieve) |
|---|---|---|
| Alkyl Sulfate | Alkyl Aryl Sulfonate | |
| 0 | 100 | 2 |
| 5 | 95 | 85 |
| 10 | 90 | 92 |
| 20 | 80 | 95 |
| 30 | 70 | 92 |
| 40 | 60 | 83 |
| 50 | 50 | 68 |
| 60 | 40 | 40 |
| 70 | 30 | 10 |
| 80 | 20 | 2 |
| 85 | 15 | 0 |
| 90 | 10 | 5 |
| 100 | 0 | 25 |

[1] Based on total weight of active ingredient (alkyl sulfate and alkyl benzene sulfonate) only.
[2] Based on total weight of entire compounded detergent composition including builder.

The above tests were carried out as follows: Alkyl sulfate detergent was added to an aqueous slurry or solution of the alkyl benzene sulfonate detergent in the concentrations and proportions previously indicated. The resulting aqueous dispersion was spray dried. Weighed samples of the dried detergent were placed in small untreated cardboard boxes (1½ x 2½ x 4"). Four samples of each detergent were used in all runs made, two of these samples being placed in sealed boxes while the other two boxes remained open. The detergent samples were placed in a humidity cabinet in a completely random manner and exposed to a relative humidity of 80.5% at a temperature of 89.6° F. for a period of one week. At the end of the exposure period all samples were reweighed and the resistance to caking was determined by cutting away an entire side of a box and carefully dumping the detergent sample onto a #4 sieve (¼" mesh) from a minimum height. The sieve was then gently swirled until all particles had come in contact with the screen. Detergent passing through the screen after this treatment was considered to be uncaked. Since caking differences between the opened and sealed boxes were found to be immaterial, the average of all four samples of each composition was taken and is reported.

It will be observed from the foregoing data that incorporation of alkyl sulfate in minor proportions rapidly increases the per cent uncaked detergent from 0% to the point that at 5% (about 2% based on the entire detergent) alkyl sulfate concentration, 85% of the detergent composition remained uncaked even under the severe conditions of this test. As previously stated, maximum anti-caking occurred at about 20% alkyl sulfate based on the active ingredient (6.5% based on the entire detergent composition). Beyond 40% alkyl sulfate based on the active ingredient (11.4% based on the entire detergent composition), the per cent uncaked detergent decreases rapidly to about zero at 85% alkyl sulfate. Accordingly, from about 1 to 40% alkyl sulfate based on the active ingredient, or about .5 to 12% alkyl sulfate based on the entire detergent, presents a critical anti-caking range. Within this range, from about 5 to 25% (2 to 6.5% based on the entire detergent) alkyl sulfate is preferred where anti-caking is the major or controlling variable.

It is apparent, of course, that alkyl sulfate may be added as anti-cakers in the foregoing proportions to alkyl aryl sulfonate detergents containing the usual ranges of total active ingredients and of the various known mono-alkyl, mononuclear types. Active ingredient contents of alkyl benzene sulfonates may range from as low as 5 to 10%, but normally do not exceed 60%. A more common range and one preferred for the purposes of the present invention is from about 10 to 40% active ingredient. More usually active ingredient is 20 to 40%.

Examples of other alkyl aryl sulfonates to which the present invention is applicable will be apparent to those skilled in the art, but an additional illustration is found in tests on a commercial "Keryl" benzene sulfonate (obtained from chlorinated petroleum and benzene as disclosed in U. S. patents issued to Flett). In this test, again carried out at 80.5% at relative humidity and 89.6° F., for one week the product itself was about 100% caked. With 5% (based on weight of the combined active ingredients) lauryl sulfate incorporated therein, the detergent composition was 89.4% uncaked and only 10.6% caked. With 15% lauryl sulfate, based on the active ingredients, 92.9% remained uncaked. Similarly, it has been found that alkyl sulfates inhibit caking not merely of spray dried alkyl aryl sulfonate detergents, but also of other particulate forms such as drum dried or flake form particulate solids, all of which normally are relatively free flowing and "pour" like fluids.

In this application the terms "tetramer" and "pentamer" are used alternatively to the terms "$C_{12}$" polymer fraction and "$C_{15}$" polymer fraction, respectively. It is to be understood that the polymerization reaction does not proceed so smoothly or accurately as to yield only exact tetra- or penta- multiples of the olefin feed, but that the terms "tetramer" or "pentamer" as used in this application are meant to be descriptive of those hydrocarbons present in the polymer product and boiling, respectively, in the $C_{12}$ and $C_{15}$ olefin boiling ranges, which ranges embrace the boiling points of various isomeric $C_{12}$ and $C_{15}$ polymer hydrocarbons present therein.

This application is a continuation-in-part of our copending application, Serial No. 718,492, filed December 26, 1946, now Patent No. 2,477,383 issued July 26, 1949.

Obviously, many modifications and variations of the invention, as hereinbefore set forth, may be made without departing from the spirit and scope thereof, and only such limitations should be imposed as are indicated in the appended claims.

I claim:

1. A monoalkyl benzene sulfonate detergent, the number of carbon atoms in the alkyl group averaging from about 12 to about 15, in solid particulate form normally tending to cake on storage in humid atmospheres and to inhibit said caking a minor amount, of an alkyl sulfate having 8 to 12 carbon atoms in the molecule the amount of said sulfate being in the range 10 to 30% by weight based on the combined weight of said monoalkyl benzene sulfonate and alkyl sulfate.

2. A composition as defined in claim 1, wherein said alkyl sulfate is lauryl sulfate.

3. A non-caking detergent composition containing an alkali metal salt of a monoalkyl benzene sulfonic acid and an alkyl sulfate as the active ingredients, the ratio by weight of alkyl sulfate to sulfonic acid salt being in the range 10:90 to 30:70.

4. The composition of claim 3, wherein the alkyl sulfate is sodium lauryl sulfate.

5. A solid particle form synthetic detergent composition characterized in that it does not cake at high relative humidity and high atmospheric temperature comprising an active detergent component and an inorganic builder, the active detergent component consisting essentially of 70 to 90% by weight of a monoalkyl benzene sulfonate containing 12 to 15 carbon atoms in the alkyl group and 10 to 30% by weight of an alkyl sulfate having 8 to 12 carbon atoms in the alkyl group.

6. A solid particle form synthetic detergent characterized by high resistance to caking at high relative humidity and high atmospheric temperature prepared by forming an aqueous slurry containing as its solid components 20 to 40% by weight of active detergent material and 60 to 80% by weight of inorganic builders, the active detergent material consisting essentially of 10 to 30% by weight of an alkyl sulfate containing 8 to 12 carbon atoms in the alkyl group and 70 to 90% of a monoalkyl benzene sulfonate having a polypropylene radical containing 12 to 15 carbon atoms as its alkyl group, and spray-drying the slurry.

ALLEN H. LEWIS.

(References on following page)

REFERENCES CITED

The following references are of record in the file of this patent:

UNITED STATES PATENTS

| Number | Name | Date |
|---|---|---|
| Re. 22,548 | Brandt | Sept. 26, 1944 |
| 2,283,199 | Flett | May 19, 1942 |
| 2,437,828 | Lyons | Mar. 16, 1948 |
| 2,448,184 | Lemmon | Aug. 31, 1948 |
| 2,450,585 | D'Ouville | Oct. 5, 1948 |
| 2,455,050 | Eisenberger et al. | Nov. 30, 1948 |
| 2,457,146 | De Grote | Dec. 28, 1948 |
| 2,477,383 | Lewis | July 26, 1949 |
| 2,486,921 | Byerly | Nov. 1, 1949 |
| 2,515,577 | Waldeck | July 18, 1950 |

FOREIGN PATENTS

| Number | Country | Date |
|---|---|---|
| 364,537 | Great Britain | Dec. 22, 1931 |

OTHER REFERENCES

Ipatieff, J. Am. Chem. Soc., vol. 58—June 1936—pp. 919–923.

Ipatieff, J. Am. Chem. Soc.—Vol. 58—Nov. 1936—p. 2339.

Surface Active Agents—Schwartz and Perry—p. 53—1949.